(12) United States Patent
Zeng

(10) Patent No.: US 12,020,385 B2
(45) Date of Patent: Jun. 25, 2024

(54) AUGMENTED REALITY PROCESSING METHOD, STORAGE MEDIUM, AND ELECTRONIC DEVICE

(71) Applicant: GUANGDONG OPPO MOBILE TELECOMMUNICATIONS CORP., LTD., Guangdong (CN)

(72) Inventor: Fantao Zeng, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 82 days.

(21) Appl. No.: 17/847,273

(22) Filed: Jun. 23, 2022

(65) Prior Publication Data

US 2022/0319136 A1 Oct. 6, 2022

Related U.S. Application Data

(63) Continuation of application No. PCT/CN2020/137279, filed on Dec. 17, 2020.

(30) Foreign Application Priority Data

Dec. 24, 2019 (CN) .......................... 201911348471.0

(51) Int. Cl.
*G06T 15/00* (2011.01)
*G06T 7/33* (2017.01)
(Continued)

(52) U.S. Cl.
CPC ............ *G06T 19/006* (2013.01); *G06T 7/337* (2017.01); *G06T 7/50* (2017.01); *G06T 7/74* (2017.01);
(Continued)

(58) Field of Classification Search
CPC ......... G06T 19/006; G06T 7/337; G06T 7/50; G06T 7/74; G06T 19/20; G06T 2200/04;
(Continued)

(56) References Cited

U.S. PATENT DOCUMENTS 10,373,381 B2   8/2019  Nuernberger et al.
2015/0154803 A1* 6/2015  Meier .................... G06T 19/00
                                              345/633
(Continued)

FOREIGN PATENT DOCUMENTS

CN      102598064       7/2012
CN      102695032       9/2012
(Continued)

OTHER PUBLICATIONS

CNIPA, First Office Action for CN Application No. 201911348471.0, Jan. 3, 2023.
(Continued)

*Primary Examiner* — Gordon G Liu
(74) *Attorney, Agent, or Firm* — Hodgson Russ LLP

(57) ABSTRACT

An augmented reality (AR) processing method, a computer readable storage medium, and an electronic device, relating to the technical field of AR. The AR processing method includes: obtaining a current frame image, extracting an image parameter of the current frame image, receiving information of a virtual object and displaying the virtual object; and editing the virtual object in response to an editing operation for the virtual object. The information of the virtual object corresponds to the image parameter of the current frame image and is determined by using a pre-stored mapping result.

20 Claims, 13 Drawing Sheets

(51) Int. Cl.
  *G06T 7/50* (2017.01)
  *G06T 7/73* (2017.01)
  *G06T 19/00* (2011.01)
  *G06T 19/20* (2011.01)
  *G06V 20/20* (2022.01)

(52) U.S. Cl.
  CPC .............. *G06T 19/20* (2013.01); *G06V 20/20* (2022.01); *G06T 2200/04* (2013.01); *G06T 2207/10016* (2013.01); *G06T 2207/30244* (2013.01); *G06T 2219/024* (2013.01); *G06T 2219/2016* (2013.01)

(58) Field of Classification Search
  CPC . G06T 2207/10016; G06T 2207/30244; G06T 2219/024; G06T 2219/2016; G06V 20/20
  USPC ......................................................... 345/419
  See application file for complete search history.

(56) References Cited

U.S. PATENT DOCUMENTS

| | | | |
|---|---|---|---|
| 2015/0193982 A1 | 7/2015 | Mihelich et al. | |
| 2017/0153787 A1 | 6/2017 | Chowdhary et al. | |
| 2018/0082117 A1* | 3/2018 | Sharma | G06T 19/003 |
| 2019/0340836 A1 | 11/2019 | Lynen et al. | |
| 2022/0051431 A1* | 2/2022 | Jagadeesan | A61B 34/20 |

FOREIGN PATENT DOCUMENTS

| | | |
|---|---|---|
| CN | 106355153 | 1/2017 |
| CN | 107025662 | 8/2017 |
| CN | 108510597 | 9/2018 |
| CN | 108550190 | 9/2018 |
| CN | 108734736 | 11/2018 |
| CN | 108805635 | 11/2018 |
| CN | 109729285 | 5/2019 |
| CN | 110275968 | 9/2019 |
| CN | 111179435 | 5/2020 |
| JP | 6548241 | 7/2019 |
| WO | 2017128934 | 8/2017 |
| WO | 2019015261 | 1/2019 |

OTHER PUBLICATIONS

EPO, Partial Supplementary European Search Report for EP Application No. 20906655.4, May 31, 2023.
CNIPA, Second Office Action for CN Application No. 201911348471.0, Aug. 16, 2023.
EPO, Extended European Search Report for EP Application No. 20906655.4, Aug. 31, 2023.
WIPO, International Search Report and Written Opinion for PCT/CN2020/137279, Mar. 17, 2021.
CNIPA, Notification to Grant Patent Right for Invention for CN Application No. 201911348471.0, Jan. 7, 2024.

* cited by examiner

AUGMENTED REALITY PROCESSING METHOD, STORAGE MEDIUM, AND ELECTRONIC DEVICE

CROSS-REFERENCE TO RELATED APPLICATIONS

The present application is a continuation of International Patent Application No. PCT/CN2020/137279, filed Dec. 17, 2020, which claims priority to Chinese Patent Application No. 201911348471.0, filed Dec. 24, 2019, the entire disclosures of which are incorporated herein by reference.

TECHNICAL FIELD

The present application relates to the field of augmented reality, and in particular, to an augmented reality processing method, a computer-readable storage medium, and an electronic device.

BACKGROUND

Augmented Reality (AR) is a technology that integrates a virtual world and the real world. The technology has been widely used in many fields such as education, games, medical care, Internet of Things, intelligent manufacturing, and so on.

In a multi-person AR solution, share of virtual object information can be realized among multiple terminals. However, in this process, each terminal needs to input a room ID number representing a scene to obtain the virtual object information, which increases users' operations; moreover, when there are multiple AR scenes (that is, there are multiple room ID numbers), users' memory burden will be increased and it is not intelligent enough.

SUMMARY OF THE DISCLOSURE

According to a first aspect of the present disclosure, an augmented reality processing method is provided, comprising: obtaining a current frame image, extracting an image parameter of the current frame image, receiving information of a virtual object and displaying the virtual object; and editing the virtual object in response to an editing operation for the virtual object. The information of the virtual object corresponds to the image parameter of the current frame image and is determined by using a pre-stored mapping result.

According to a second aspect of the present disclosure, a non-transitory computer-readable storage medium is provided. It stores a computer program, and the program, when being executed by a processor, implements the above augmented reality processing method.

According to a third aspect of the present disclosure, an electronic device is provided, comprising: a processor; and a memory configured to store one or more program; when the one or more program is executed by a processor, the processor is enabled to implement any one of the above augmented reality processing methods.

DETAILED DESCRIPTION

Figure 1:
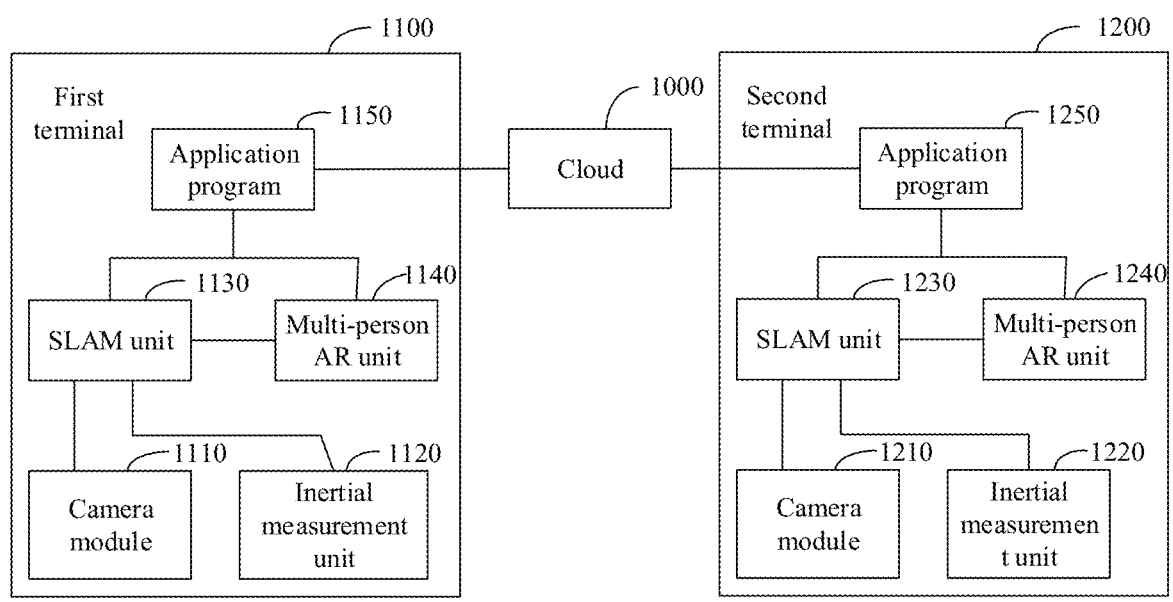
FIG. 1 shows a structural schematic diagram of a system for realizing multi-person AR in an embodiment of the present disclosure.

Exemplary embodiments will now be described more fully with reference to the accompanying drawings. However, the exemplary embodiments can be embodied in various forms and should not be construed as limited to the examples set forth herein; rather, these embodiments are provided so that the present disclosure will be more thorough and complete, and will fully convey the concept of the exemplary embodiments to those skilled in the art. The described features, structures, or characteristics may be combined in any suitable manner in one or more embodiments. In the following description, numerous specific details are provided in order to give thorough understanding of the embodiments of the present disclosure. However, those skilled in the art will appreciate that the technical solutions of the present disclosure may be practiced without one or more of the specific details, or other methods, components, devices, steps, and so on may be employed. In other instances, well-known solutions will not be shown or described in detail to avoid "a presumptuous guest usurping the host's role" from obscuring aspects of the present disclosure.

Furthermore, the accompany drawings are merely schematic illustrations of the present disclosure and are not necessarily drawn to scale. The same reference numerals in the drawings denote the same or similar parts, and thus their repeated descriptions will be omitted. Some of the block diagrams shown in the accompany drawings are functional entities and do not necessarily correspond to physically or logically separate entities. These functional entities may be implemented in software, or in one or more hardware modules or integrated circuits, or in different networks and/or processor devices and/or microcontroller devices.

The flow charts shown in the accompany drawings are merely exemplarily illustrative and do not necessarily include all steps. For example, some steps can be decomposed, and some steps can be combined or partially combined, so the actual execution order may be changed according to actual situations. In addition, all of the following terms "first", "second", "third", and the like are for the purpose of distinction only and should not be taken as any limitation of the present disclosure.

FIG. 1 shows a structural schematic diagram of a system for realizing multi-person AR in an embodiment of the present disclosure.

As shown in FIG. 1, a system for realizing multi-person AR in an embodiment of the present disclosure can include a server 1000 which can be the cloud and is hereinafter referred to as "the cloud 1000", a first terminal 1100, and a second terminal 1200. In exemplary description of the present disclosure, it is usually possible to take the second terminal 1200 as a terminal for mapping for scenes; during a mapping process, the second terminal 1200 can configure virtual objects in scenes, and can send constructed map information and virtual object information to the cloud 1000 for maintenance. The first terminal 1000 can be a terminal performing re-position and acquiring the virtual object information from the cloud 1000.

The first terminal 1100 and the second terminal 1200 can be terminals capable of performing AR related processing, including but not limited to mobile phones, tablets, smart wearable devices, and the like. The cloud 1000 can also be referred to as to a server or a cloud server, which may be a single server or a server cluster composed of multiple servers. The first terminal 1100 or the second terminal 1200 can be connected to the cloud 1000 through a medium of a communication link, and the medium of the communication link may include, for example, a wired or wireless communication link, an optical fiber cable, etc.

In addition, in a scene implementing multi-person AR, the system can further include a third terminal, a fourth terminal, and other mobile terminals for performing communication connections with the cloud 1000; the present disclosure does not limit the number of terminals included in the system.

The first terminal 1100 can acquire a current frame image, extract an image parameter of the current frame image, and send the image parameter to the cloud 1000; the cloud 1000 determines, by using a pre-stored mapping result, information of a virtual object corresponding to the image parameter of the current frame image, and send the information of the virtual object to the first terminal 1000. Afterwards, the first terminal 1000 can display the virtual object, edit the virtual object in response to an editing operation for the virtual object, and feedback an editing result to the cloud 1000 to be stored and maintained by the cloud 1000.

Among them, the mapping result pre-stored in the cloud 1000 and the information of the virtual object can be determined through a mapping process by, for example, the second terminal 1200. In addition, it should be noted that in some embodiments, the first terminal 1100 can also be a device performing mapping, and the second terminal 1200 can also be a device performing re-position to acquire the virtual object. Moreover, the first terminal 1100 can also just be the second terminal 1200, that is, after the first terminal 1100 performs mapping and configures a virtual object, when the first terminal 1100 is in a mapping scene again, it can acquire the pre-configured virtual object.

As shown in FIG. 1, the first terminal 1100 can include a camera module 1110, an inertial measurement unit 1120, a simultaneous localization and mapping (SLAM) unit 1130, a multi-person AR unit 1140, and an application program 1150.

The camera module 1110 can be used to capture video frame images, the video frame images are usually RGB images. During a process of performing the following augmented reality processing, the camera module 1110 can be used to acquire a current frame image.

The inertial measurement unit 1120 can include a gyroscope and an accelerometer, respectively measure an angular velocity and an acceleration of the first terminal 1100, and then determine inertial information of the first terminal 1100.

The simultaneous localization and mapping unit 1130 can be used to acquire inertial information sent by the inertial measurement unit 1120 and images sent by the camera module 1110, and perform a mapping or re-position process.

The multi-person AR unit 1140 can acquire a current frame image sent by the simultaneous localization and mapping unit 1130 and determine an image parameter of the current frame image.

In this embodiment of the present disclosure, the application program 1150 can send a determined image parameter to the cloud 1000. Furthermore, in an embodiment in which the first terminal 1100 is used to configure virtual objects, a user can also use the application program 1150 to configure virtual objects and upload information of the configured virtual objects to the cloud 1000.

Furthermore, the first terminal 1000 can further, for example, include a depth sensing module (not shown) used to capture depth information of scenes, so as to further construct image parameters using the depth information. Specifically, the depth sensing module can be a dual-camera module, a structured light module, or a TOF (Time-Of-Flight, time-of-flight ranging) module. The present disclosure has no specific restriction here.

Similarly, the second terminal 1200 can include at least a camera module 1210, an inertial measurement unit 1220, a simultaneous localization and mapping unit 1230, a multi-person AR unit 1240, and an application program 1250.

Figure 2:
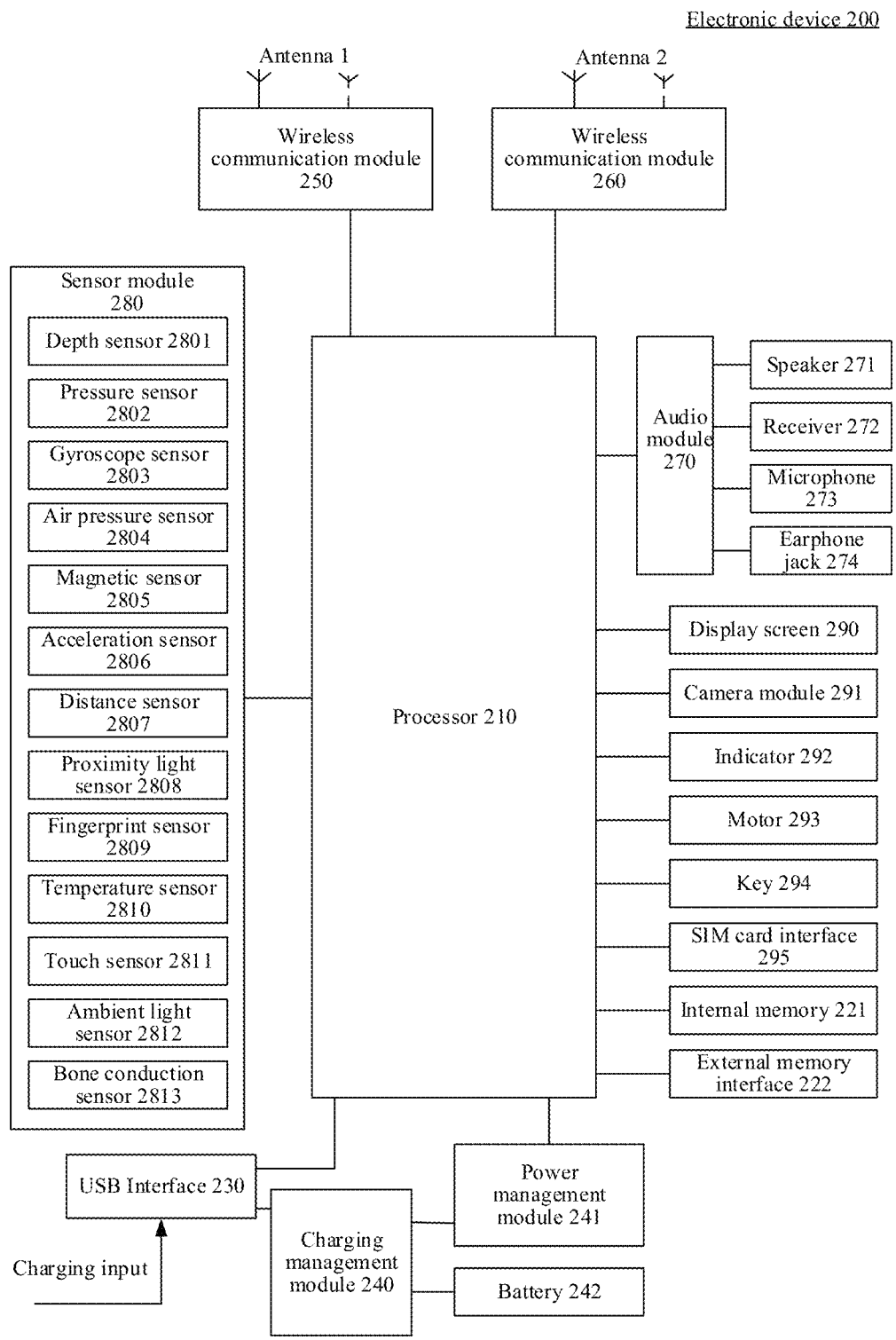
FIG. 2 shows a structural schematic diagram of an electronic device applicable to realize embodiments of the present disclosure.

FIG. 2 shows a schematic diagram of an electronic device applicable to realize exemplary embodiments of the present disclosure. Specifically, the electronic device can refer to the first terminal, the second terminal, the third terminal, and the like described in the present disclosure. It needs to be noted that the electronic device shown in FIG. 2 is also an example and should not bring any restriction into functions and use scopes of embodiments of the present disclosure.

The electronic device of the present disclosure includes at least a processor and a memory, the memory is used to store one or more program, and when the one or more program is executed by the processor, the processor is enabled to implement at least an image processing method applicable to a first terminal of an exemplary embodiment of the present disclosure.

Specifically, as shown in FIG. 2, the electronic device 200 can include: a processor 210, an internal memory 221, an external memory interface 222, a universal serial bus (USB) interface 230, a charging management module 240, a power management module 241, a battery 242, an antenna 1, an antenna 2, a mobile communication module 250, a wireless communication module 260, an audio module 270, a speaker 271, a receiver 272, a microphone 273, an earphone jack 274, a sensor module 280, a display screen 290, a camera module 291, an indicator 292, a motor 293, keys 294, a subscriber identification module (SIM) card interface 295, etc. Among them, the sensor module 280 can include a depth sensor 2801, a pressure sensor 2802, a gyroscope sensor 2803, an air pressure sensor 2804, a magnetic sensor 2805, an acceleration sensor 2806, a distance sensor 2807, a proximity light sensor 2808, a fingerprint sensor 2809, a temperature sensor 2810, a touch sensor 2811, an ambient light sensor 2812, a bone conduction sensor 2813, etc.

It can be understood that the structures illustrated in the embodiments of the present application do not constitute any specific limitation to the electronic device 200. In other embodiments of the present application, the electronic device 200 may include more or less components than shown in the drawings, or combine some components, or separate some components, or include arrange different components. The illustrated components may be implemented by hardware, software, or a combination of software and hardware.

The processor 210 can include one or more processing unit. For example, the processor 210 can include an application processor (AP), a modem processor, a graphics processor (Graphics Processing Unit, GPU), an image signal processor (ISP), a controller, a video codec processor, a digital signal processor (DSP), a baseband processor, and/or a neural network processor (Neural-network Processing Unit, NPU), etc. Among them, different processing units may be independent devices, and may also be integrated in one or more processors. In addition, a memory may also be provided in the processor 210 for storing instructions and data.

The USB interface 230 is an interface conforming to the USB standard specification, and may specifically be a Mini-USB interface, a Micro-USB interface, a USB Type-C interface, etc. The USB interface 230 can be used to connect a charger to charge the electronic device 200, and can also be used to transmit data between the electronic device 200 and peripheral devices. It can also be used to connect headphones to play audio through the headphones. The interface can further be used to connect other electronic devices, such as AR devices or the like.

The charging management module 240 is used to receive charging input from a charger. Among them, the charger may be a wireless charger, and may also be a wired charger. The power management module 241 is used for connecting the battery 242 and the charging management module 240 with the processor 210. The power management module 241 receives input from the battery 242 and/or the charging management module 240, and supplies power to the processor 210, the internal memory 221, the display screen 290, the camera module 291, the wireless communication module 260, etc.

A wireless communication function of the electronic device 200 may be implemented by the antenna 1, the antenna 2, the mobile communication module 250, the wireless communication module 260, the modem processor, the baseband processor, etc.

The mobile communication module 250 may provide wireless communication solutions including 2G/3G/4G/5G, etc., which are applied on the electronic device 200.

The wireless communication module 260 ma provide wireless communication solutions including wireless local area networks (WLAN) such as a wireless fidelity (Wi-Fi) network, Bluetooth (BT), global navigation satellite system (GNSS), frequency modulation (FM), near field communication (NFC), infrared (IR) technology, etc., which are applied on the electronic device 200.

The electronic device 200 implements a display function through a GPU, the display screen 290, an application processor, etc. The GPU is a microprocessor for image processing, and is connected to the display screen 290 and the application processor. The GPU is used to perform mathematical and geometric calculations for graphics rendering. The processor 210 may include one or more GPU, which executes program instructions to generate or change display information.

The electronic device 200 can realize a shooting function through the ISP, the camera module 291, the video codec, the GPU, the display screen 290, the application processor, etc. In some embodiments, the electronic device 200 may include one or N camera module 291, wherein N is a positive integer greater than 1. If the electronic device 200 includes N cameras, one of the N cameras is a main camera.

The internal memory 221 can be used to store computer-executable program codes, the executable program codes include instructions. The internal memory 221 may include a program storage area and a data storage area. The external memory interface 222 can be used to connect an external memory card, such as a Micro SD card, to expand storage capacity of the electronic device 200.

The electronic device 200 can realize audio functions, such as playing music, recording, etc., by the audio module 270, the speaker 271, the receiver 272, the microphone 273, the earphone jack 274, the application processor, etc.

The audio module 270 is used to convert digital audio information into analog audio signal output, and is also used to convert analog audio input into digital audio signals. The audio module 270 can also be used to encode and decode audio signals. In some embodiments, the audio module 270 may be provided in the processor 210, or some functional modules of the audio module 270 may be provided in the processor 210.

The speaker 271, also called "trumpet", is used to convert audio electrical signals into sound signals. The electronic device 200 can be used to listen to music or listen to a hands-free call through the speaker 271. The receiver 272, also called "earpiece", is used to convert audio electrical signals into sound signals. When the electronic device 200 answers a call or a voice message, the voice can be answered by placing the receiver 272 close to a human ear. The microphone 273, also called "mike" or "transmitter", is used to convert sound signals into electrical signals. When making a call or sending a voice message, a user can make a sound by placing a human mouth close to the microphone 273 to input a sound signal into the microphone 273. The electronic device 200 may be provided with at least one microphone 273. The earphone jack 274 is used to connect wired earphones.

Regarding the sensors included in the electronic device 200, the depth sensor 2801 is used to acquire depth information of scenery. The pressure sensor 2802 is used to sense pressure signals, and can convert the pressure signals into electrical signals. The gyroscope sensor 2803 can be used to determine a motion attitude of the electronic device 200. The air pressure sensor 2804 is used to measure an air pressure. The magnetic sensor 2805 includes a Hall sensor. The electronic device 200 can use the magnetic sensor 2805 to detect opening and closing of a flip holster. The acceleration sensor 2806 can detect the magnitude of acceleration of the electronic device 200 in various directions (generally three axes). The distance sensor 2807 is used to measure a distance. The proximity light sensor 2808 may include, for example, a light emitting diode (LEDs) and a light detector, such as a photodiode. The fingerprint sensor 2809 is used to collect fingerprints. The temperature sensor 2810 is used to detect a temperature. The touch sensor 2811 can transmit detected touch operations to the application processor to determine types of touch events. Visual output related to touch operations may be provided through the display screen 290. The ambient light sensor 2812 is used to sense an ambient light brightness. The bone conduction sensor 2813 can acquire vibration signals.

The keys 294 include a power-on key, a volume key, and the like. The keys 294 may be mechanical keys, and can also be touch keys. The motor 293 can generate vibrating cues. The motor 293 can be used for vibrating alerts for incoming calls, and can also be used for touch vibration feedback. The indicator 292 can be an indicator light, which can be used to indicate a charging status and a change of power, and can also be used to indicate messages, missed calls, notifications, and the like. The SIM card interface 295 is used to connect a SIM card. The electronic device 200 interacts with the network through the SIM card to realize functions such as call and data communication.

The present application further provides a computer-readable storage medium, the computer-readable storage medium can be included in the electronic device described in the above embodiments, and can also exist alone and not be assembled in the electronic device.

The computer-readable storage medium may be, for example, but are not limited to, an electrical, magnetic, optical, electromagnetic, infrared, or semiconductor system, apparatus or device, or a combination of any of the above. More specific examples of the computer-readable storage medium may include, but are not limited to, electrical connections with one or more wires, portable computer disks, hard disks, random access memory (RAM), read only memory (ROM), erasable programmable read only memory (EPROM or flash memory), optical fiber, portable compact disk read only memory (CD-ROM), optical storage devices, magnetic storage devices, or any suitable combination of the above. In the present disclosure, the computer-readable storage medium may be any tangible medium that contains or stores a program, the program can be used by or in conjunction with an instruction execution system, apparatus, or device.

The computer-readable storage medium can transmit, propagate, or transport the program configured to be used by or in connection with the instruction execution system, apparatus, or device. Program code included in the computer-readable storage medium may be transmitted using any suitable medium including, but not limited to, wireless, wireline, optical fiber cable, RF, etc., or any suitable combination of the above.

The computer-readable storage medium loads one or more program; when the one or more program is executed by an electronic device, the electronic device is enabled to implement methods according to the following embodiments.

The flowcharts and block diagrams in the accompany drawings illustrate architectures, functions, and operations, which may be realized, of systems, methods and computer program products according to various embodiments of the present disclosure. In this regard, each block in the flowcharts or block diagrams may represent a module, a program segment, or a portion of codes, and the module, the program segment, or the portion of codes contains one or more executable instruction for implementing a specified logical function. It should also be noted that, in some alternative implementations, the functions noted in the blocks may occur out of the order noted in the accompany drawings. For example, two blocks shown in succession may, in fact, be executed substantially concurrently, or they may sometimes be executed in the reverse order, depending upon involved functions. It should also be noted that each block of the block diagrams or flowcharts, and combinations of the blocks in the block diagrams or flowcharts can be implemented in dedicated hardware-based systems that perform specified functions or operations, or can be implemented using a combination of dedicated hardware and computer instructions.

The units involved by the description in the embodiments of the present disclosure may be implemented in the form of software, and may also be implemented in the form of hardware; the described units may also be provided in a processor. Among them, the names of these units do not constitute any limitation to the units themselves under certain circumstances.

Figure 3:
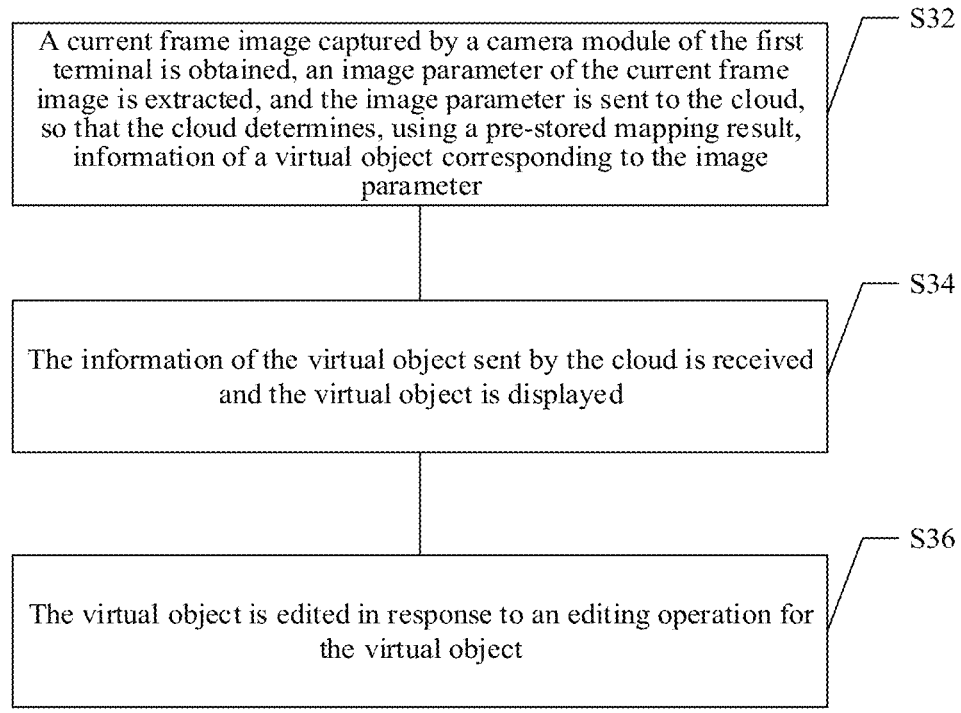
FIG. 3 schematically shows a flow chart of an augmented reality processing method according to an exemplary embodiment of the present disclosure.

FIG. 3 schematically shows a flow chart of an augmented reality processing method, which is applicable to a first terminal, of an exemplary embodiment of the present disclosure. As shown in FIG. 3, the augmented reality processing method can include the following operations.

S32, a current frame image captured by a camera module of the first terminal is obtained, an image parameter of the current frame image is extracted, and the image parameter is sent to the cloud, so that the cloud determines, by using a pre-stored mapping result, information of a virtual object corresponding to the image parameter.

According to some embodiments of the present disclosure, after using its camera module to capture the current frame image, the first terminal can extract two-dimensional feature point information of the current frame image as the image parameter corresponding to the current frame image, and send it to the cloud.

In order to more accurately express information contained in a current scene, in other embodiments of the present disclosure, the image parameter of the current frame image may include two-dimensional feature point information and three-dimensional feature point information of the current frame image.

The two-dimensional feature point information of the current frame image can be extracted based on a combination of a feature extraction algorithm and a feature descriptor. Feature extraction algorithms employed by the exemplary embodiments of the present disclosure may include, but are not limited to, FAST feature point detection algorithm, DOG feature point detection algorithm, Harris feature point detection algorithm, SIFT feature point detection algorithm, SURF feature point detection algorithm, and the like. Feature descriptors may include, but are not limited to, BRIEF feature point descriptor, BRISK feature point descriptor, FREAK feature point descriptor, and the like.

According one embodiment of the present disclosure, a combination of a feature extraction algorithm and a feature descriptor can be the FAST feature point detection algorithm and the BRIEF feature point descriptor. According other embodiments of the present disclosure, a combination of a feature extraction algorithm and a feature descriptor can be the DOG feature point detection algorithm and the FREAK feature point descriptor.

It should be understood that different combination forms can also be used for different texture scenes. For example, for strong texture scenes, the FAST feature point detection algorithm and the BRIEF feature point descriptor can be used for feature extraction; for weak texture scenes, the DOG feature point detection algorithm and the FREAK feature point descriptor can be used for feature extraction.

On the condition that the two-dimensional feature point information of the current frame image has been determined, the three-dimensional feature point information of the current frame image can be determined by combining depth information corresponding to the two-dimensional feature point information.

Specifically, when the current frame image is acquired, depth information corresponding to the current frame image can be captured through a depth sensing module. Among them, the depth sensing module may be any one of a dual-camera module (e.g., a color camera and a telephoto camera), a structured light module, and a TOF module.

After the current frame image and the corresponding depth information are obtained, the current frame image and the depth information can be registered to determine depth information of each pixel on the current frame image.

For the registration process, it is necessary to calibrate internal and external parameters of the camera module and the depth sensing module in advance.

Specifically, a three-dimensional vector $p\_ir=(x, y, z)$ can be constructed, where x, y represent pixel coordinates of a pixel, and z represents a depth value of the pixel. A coordinate $P\_ir$ of the pixel in a coordinate system of the depth sensing module can be obtained by using an internal parameter matrix of the depth sensing module. Then P it can be multiplied by a rotation matrix R, and a translation vector T is added, so that P it can be converted into a coordinate system of an RGB camera to obtain $P\_rgb$. Afterwards, $P\_rgb$ can be multiplied by an internal parameter matrix $H\_rgb$ of the camera module to obtain $p\_rgb$, and $p\_rgb$ is also a three-dimensional vector, denoted as $(x0, y0, z0)$, wherein x0 and y0 are pixel coordinates of the pixel in an RGB image; a pixel value of the pixel is extracted, and is matched with corresponding depth information. Thus, alignment of two-dimensional image information and depth information of a pixel is completed. In this case, the above process is performed for each pixel to complete the registration process.

After depth information of each pixel on the current frame image is determined, depth information corresponding to the two-dimensional feature point information can be determined from them, and the two-dimensional feature point information and the depth information corresponding to the two-dimensional feature point information can be combined to determine three-dimensional feature point information of the current frame image.

In addition, after acquiring the depth information from the depth sensing module, the depth information can also be denoised to remove obviously wrong depth values in the depth information. For example, a deep neural network can be used to remove noise in a TOF image, which is not particularly limited in this exemplary embodiment.

Figure 4:
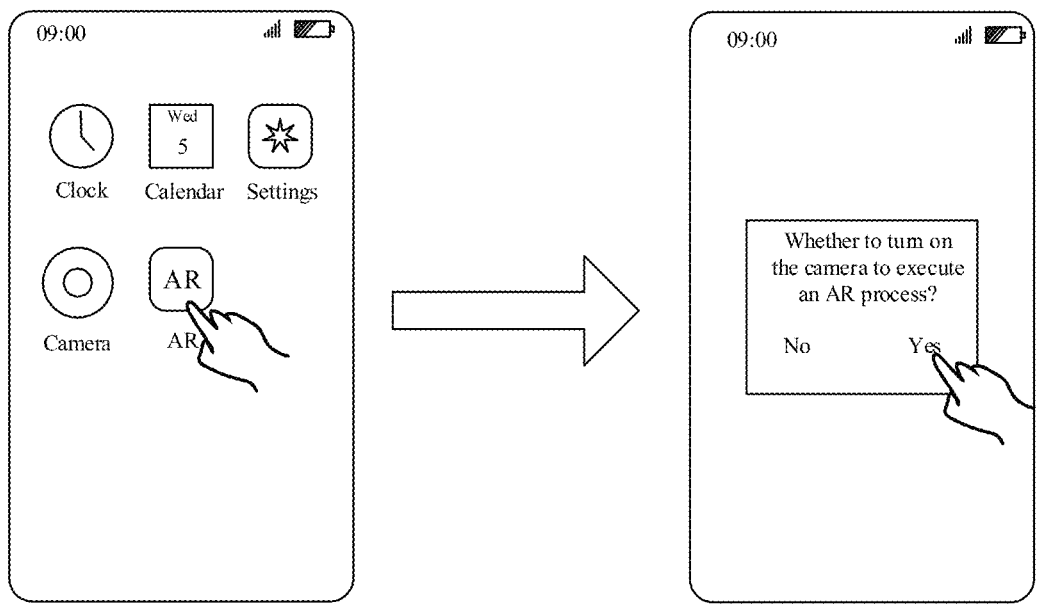
FIG. 4 shows a schematic view of an interface for a first terminal to execute an augmented reality process in response to a user's operation.

FIG. 4 shows a schematic view of performing acquiring a current frame image in response to a user's operation. As shown in FIG. 4, after a user clicks an icon of an "AR" application on an interface, the application is entered, and the interface appears a determining option for performing acquiring video frame images, that is, determining "whether turning on a camera to perform an AR process". After the user clicks "yes", the first terminal controls a camera module to be turned on, and capture a current frame image to perform the aforesaid process of extracting an image parameter.

In view of the fact that execution of the AR process will consume the resources of the terminal and it is considered that whether some scenes are suitable for shooting, the above determining process is provided for a user to choose.

After determining the image parameter of the current frame image, the first terminal can send the image parameters to the cloud, so that the cloud can determine information of a virtual object corresponding to the image parameter by using a pre-stored mapping result.

A process of determining information corresponding to a virtual object by the cloud will be described below.

According to some embodiments of the present disclosure, the first terminal can also send location information of a current scene to the cloud. Specifically, the first terminal can determine the location information of the current scene using any one of the following systems: the Global Positioning System (GPS), the Global Navigation Satellite System (GLONASS), the Beidou Avigation Satellite System (BDS), the Quasi-Zenith Satellite System (QZSS), and/or Satellite Based Augmentation Systems (SBAS).

After acquiring the location information, the cloud can determine one or more pre-built map corresponding to the location information. It is easy to understand that information of the pre-built map may correspond to its actual geographic location information.

If there is only one corresponding map, an image parameter of a key frame image corresponding to the map is determined and matched with the image parameter of the current frame image sent by the first terminal to determine information of a corresponding virtual object.

If there are multiple corresponding maps, key frame images of these maps are used as a search set, a key frame image matching the current frame image of the first terminal is found, and then information of a corresponding virtual object is determined.

If there is no corresponding map, that is, there is no reference image matching the image parameter of the current frame image in the mapping result pre-stored in the cloud, the cloud can send a mapping prompt to the first terminal to prompt the first terminal that a map construction process for the current scene can be performed. In this case, the user can perform map construction operations according to the prompt, and feedback construction results to the cloud.

That is, in these embodiments, the cloud can determine a search range of pre-stored mapping results according to the location information of the first terminal, and use results within the search range to determine information of corresponding virtual objects. As a result, the problem that there are many pre-stored mapping results and search takes a long time is avoided.

According to other embodiments of the present disclosure, when computing resources of the cloud are sufficient or the number of pre-stored mapping results is small, after the first terminal sends the image parameter of the current frame image to the cloud, the cloud can directly use the pre-stored mapping results to perform search, so as to determine a key frame image corresponding to the image parameter of the current frame image, and further determine a virtual object corresponding to the key frame image to obtain information of a virtual object corresponding to the current frame image of the first terminal.

For the process of determining information of a corresponding virtual object by the cloud, a determined image matching the current frame image is recorded as a reference image, and a terminal that shoots the reference image is recorded as the second terminal. Information of a virtual object placed at the first terminal is determined according to a relative posture relationship between the first terminal and the second terminal and virtual object information configured by the second terminal when building a map.

In terms of determining the relative posture relationship between the first terminal and the second terminal, a posture of the current frame image relative to the second terminal can be determined based on the image parameter of the current frame image and an image parameter of the reference image, and the relative posture relationship between the first terminal and the second terminal can be determined using posture information of the first terminal when capturing the current frame image.

The following describes a process of determining a posture of the current frame image relative to the second terminal.

According to an embodiment of the present disclosure, a relationship between two-dimensional feature point information of the current frame image and two-dimensional feature point information of the reference image can be determined by means of feature matching or descriptor matching. If it is determined that the two-dimensional feature point information of the current frame image matches the two-dimensional feature point information of the reference image, a relative posture relationship between three-dimensional feature point information of the current frame image and three-dimensional feature point information of the reference image can be determined by means of Iterative Closest Point (ICP).

Specifically, the three-dimensional feature point information of the current frame image is point cloud information corresponding to the current frame image, and the three-dimensional feature point information of the reference image is point cloud information of the reference image. The two kinds of point cloud information can be used as input, by inputting specified posture as the initial value, an optimal relative posture after aligning two point clouds is obtained by means of iterating closest point, that is, the relative posture relationship between the three-dimensional feature point information of the current frame image and the three-dimensional feature point information of the reference image is determined. Thus, based on the posture information of the second terminal when acquiring the reference image, the posture of the current frame image relative to the second terminal can be determined.

It should be understood that, before performing point cloud matching, the relationship between the two-dimensional information is first determined. Since the determination of the two-dimensional information relationship usually adopts the method of feature matching or descriptor matching, the process is simple. Thus, the whole process of matching can be accelerated, and effect of debug in advance can also be achieved while the accuracy is improved.

In addition, in the above-mentioned process of matching the two-dimensional feature point information, there may be a problem of mismatching due to the problem of features and descriptors. Thus, exemplary embodiments of the present disclosure may also include a scheme for removing mismatched points.

The RANSAC (Random Sample Consensus) method can be used to eliminate information of mismatched feature points. Specifically, a certain number of matching pairs (for example, 7 pairs, 8 pairs, etc.) are randomly selected from matching pairs between the two-dimensional feature points of the current frame image and the two-dimensional feature points of the reference image, and a fundamental matrix or essential matrix between the current frame image and the reference image is calculated using the selected matching pairs. Based on epipolar constraints, if a distance from a two-dimensional feature point to a corresponding epipolar line is far, for example, greater than a threshold, it can be considered that the two-dimensional feature point is a mismatch point. By iterating the random sampling process for a certain number of times, a random sampling result with the largest number of interior points is selected as the final matching result. On this basis, information of mismatched feature points can be eliminated from the three-dimensional feature point information of the current frame image.

Thus, the posture of the current frame image relative to the second terminal can be determined by using the three-dimensional feature point information from which information of mismatched feature points is eliminated.

According to another embodiment of the present disclosure, first, if the two-dimensional feature point information of the current frame image matches the two-dimensional feature point information of the reference image, the two-dimensional feature point information of the current frame image is associated with the three-dimensional feature point information of the reference image to obtain point pair information. Next, the point pair information can be used as input to solve the Perspective-n-Point (PnP) problem, and the posture of the current frame image relative to the second terminal is determined according to the three-dimensional feature point information of the current frame image in combination with the solution result.

Among them, PnP is a classic method in the field of machine vision, which can determine a relative posture between a camera and an object according to n feature points on the object. Specifically, a rotation matrix and a translation vector between the camera and the object can be determined according to the n feature points on the object. In addition, n may be determined to be 4 or more, for example.

According to yet another embodiment of the present disclosure, the relative posture relationship between the three-dimensional feature point information obtained in combination with the solution result of PnP in the previous embodiment and the three-dimensional feature point information of the reference image can be used as an initial posture of iteration to input, and the relative posture relationship between the three-dimensional feature point information of the current frame image and the three-dimensional feature point information of the reference image is determined using a method of iterating the proximate point, so as to determine the posture of the current frame image relative to the second terminal. It is easy to see that in this embodiment, PnP and ICP are combined to improve the accuracy of determining the posture relationship.

After determining information of a virtual object corresponding to the image parameter of the current frame image, the cloud can send the information of the virtual object to the first terminal.

According to some embodiments of the present disclosure, before the cloud sends the information of the virtual object, the cloud can determine acquisition authority for the virtual object. Generally, the acquisition authority can be set by the second terminal that configures the virtual object. For example, the acquisition authority includes but is not limited to that: only friends can obtain, only the second terminal itself can obtain, open to all devices, etc.

If the first terminal meets the acquisition authority, the cloud performs the process of sending the information of the virtual object to the first terminal; if the first terminal does not meet the acquisition authority, the cloud can send an authority error prompt to the first terminal to represent that the first terminal does not have the authority of acquiring virtual objects. Alternatively, if the first terminal does not meet the acquisition authority, no result is fed back to the first terminal, and for the first terminal, acquired information is that there is no preconfigured virtual object in the current scene.

Specifically, the cloud can obtain an identification of the first terminal. If the identification of the first terminal is in an identification whitelist configured by the second terminal, the first terminal meets the acquisition authority; if the identification of the first terminal is not in the identification whitelist, the first terminal does not meet the acquisition authority.

S34, the information of the virtual object sent by the cloud is received and the virtual object is displayed.

After acquiring the information of a virtual object, the first terminal parses out information of the virtual object itself and corresponding position information, so as to display the virtual object. Thus, a user can see the virtual object through a screen of the first terminal.

It is easy to understand that virtual objects can be edited by a mapping person through a mapping terminal, and the present disclosure does not limit any of types, colors and sizes of the virtual objects.

S36, the virtual object is edited in response to an editing operation for the virtual object.

In an exemplary embodiment of the present disclosure, the editing operation for the virtual object may include at least one of the following: deleting the virtual object, moving the virtual object, rotating the virtual object, and modifying attributes of the virtual object. Among them, the attributes of the virtual object may include, but are not limited to, size, color, deformation direction and degree, and the like. In addition, a cutting operation can also be performed on the virtual object, for example, the virtual object is structurally divided into two or divided into multiple parts, and only one part is retained when being displayed. These are all editing operations for virtual objects.

According to some embodiments of the present disclosure, on an interface of the first terminal, it is possible to display an editing sub-interface of a virtual interface in response to a selecting operation for the virtual object, that is, selecting the virtual object; the editing sub-interface can be a sub-interface independent from a terminal interface. Afterwards, in response to editing operations on the editing sub-interface, the virtual object is edited.

According to other embodiments of the present disclosure, differing from the above-mentioned solution of editing a sub-interface or combined with the above-mentioned editing sub-interface, on an interface of the first terminal, it is possible to directly perform operations such as clicking, stretching, moving, and the like for a virtual object, so as to implement editing of the virtual object.

Some ways of editing will be exemplified below with reference to FIGS. 5 to 9.

Figure 5:
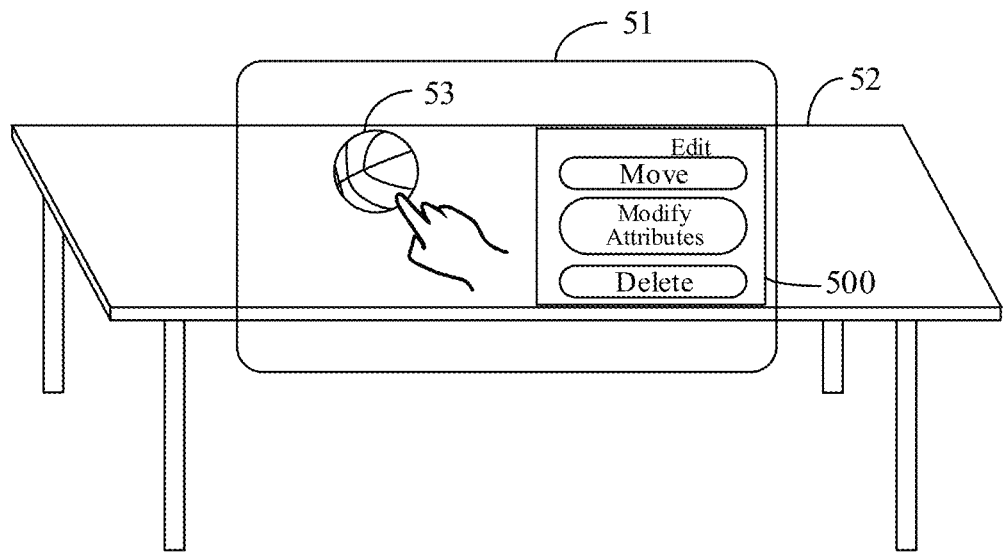
FIG. 5 shows a schematic view of a first terminal displaying an editing sub-interface of a virtual object on an interface in response to a user's selecting operation in an embodiment of the present disclosure.

As shown in FIG. 5, a camera module of the first terminal 51 shoots towards a real table 52. After the above-mentioned process of determining a virtual object is performed, a virtual object 53 is displayed on a screen of the first terminal 51, and the virtual object 53 is, for example, a virtual ball.

When a user clicks the virtual object 53 on the screen, that is to say, the user performs a selection operation for the virtual object, an editing sub-interface 500 can appear in an interface on the screen, and the user can click buttons, such as moving, attribute modifying, deleting, and the like in the editing sub-interface 500, to further realize corresponding editing functions.

In addition, the user can also display the editing sub-interface 500 by long-pressing the screen, double-clicking the screen, etc., which is not limited in this exemplary embodiment.

When there is at least one virtual object in the interface, the virtual object can also be selected through an object list, thereby avoiding mutual occlusion between virtual objects or between a virtual object and a real object, which is unfavorable for selection.

Figure 6:
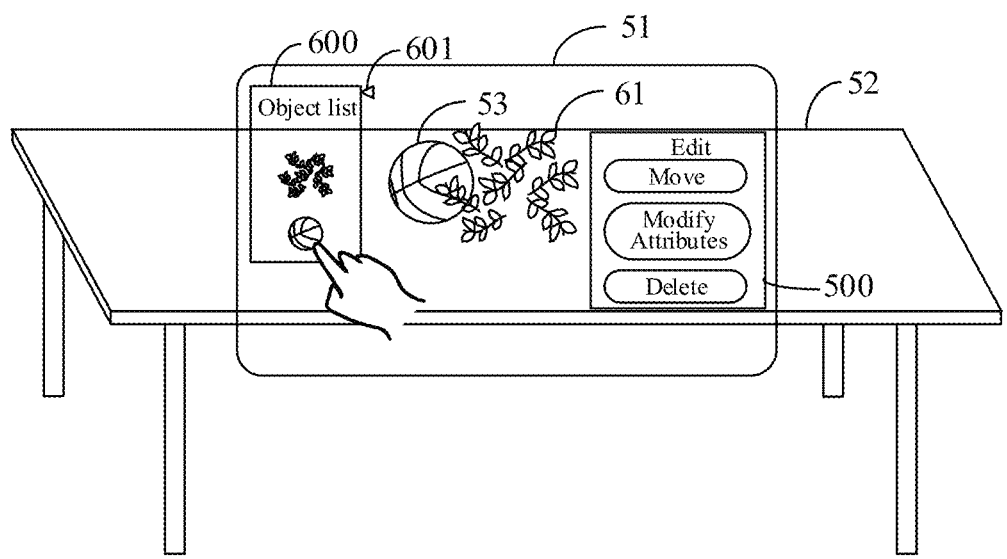
FIG. 6 shows a schematic view of a first terminal displaying an editing sub-interface of a virtual object on an interface in response to a user's selecting operation in another embodiment of the present disclosure.

Referring to FIG. 6, a virtual object 53 and a virtual object 61 are displayed on the screen of the first terminal 51. A user can expand an object list 600 by clicking a hide button 601, and the object list 600 can contain a thumbnail image or logo (e.g., text, etc.) of the virtual objects, so that the user can trigger display of the editing sub-interface 500 by clicking on the thumbnail image or logo. Initially, the object list 600 may be hidden to avoid obscuring other objects in the interface.

Figure 7:
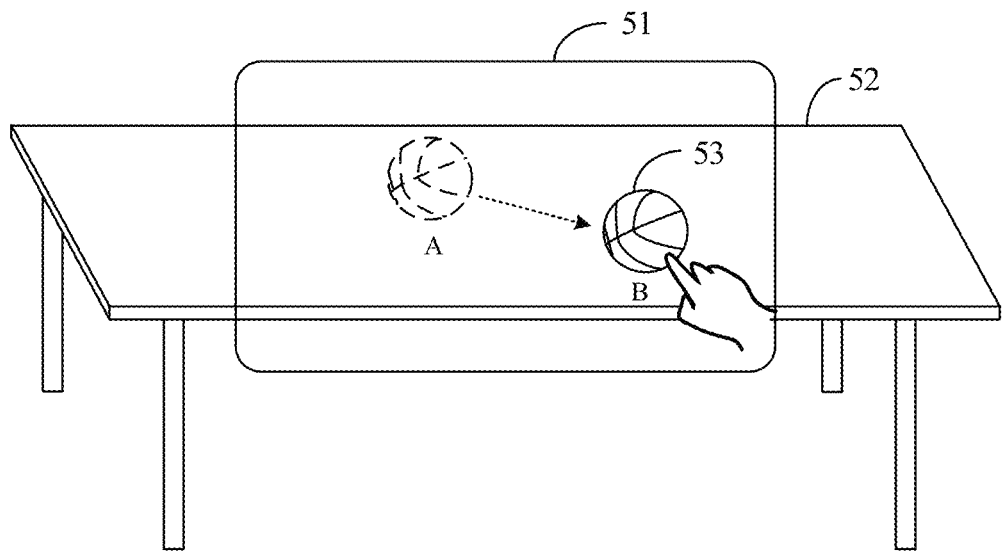
FIG. 7 shows a schematic view of a first terminal moving a virtual object in response to a user's operation in an embodiment of the present disclosure.

FIG. 7 shows a schematic diagram of moving a virtual object. In one example, the virtual object 53 can be moved from a position A to a position B by dragging the virtual object 53. In another example, after a user clicks a moving button in the editing sub-interface 500, clicking the area of the position B can realize the effect of moving the virtual object 53 from the position A to the position B.

Figure 8:
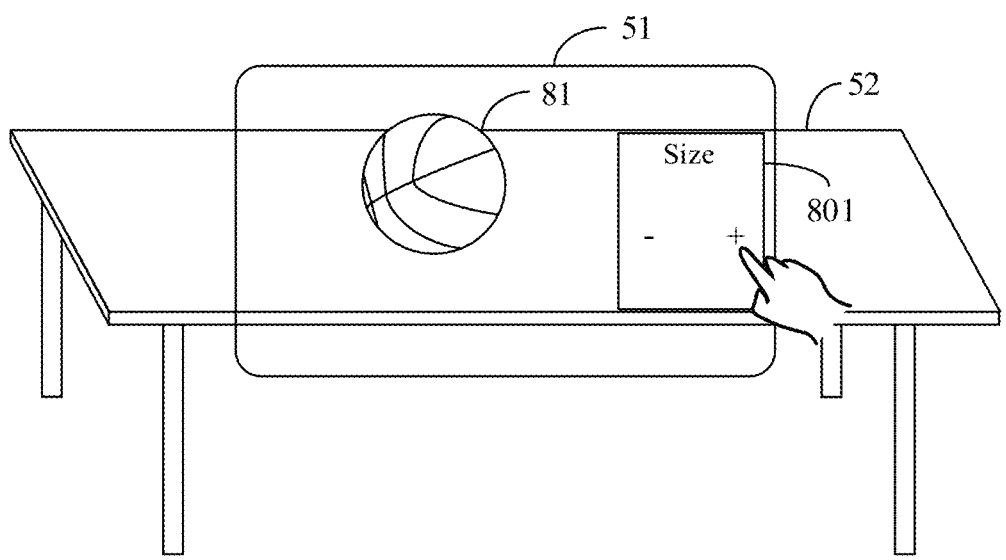
FIG. 8 shows a schematic view of a first terminal adjusting a size of a virtual object in response to a user's operation in an embodiment of the present disclosure.

FIG. 8 shows a schematic diagram of editing a size of a virtual object. In this embodiment, in response to a user's click operation on an attribute modifying button in the editing sub-interface 500, a size modification sub-interface 801 is further displayed. After the user clicks a button corresponding to size increase, the virtual object 53 can be enlarged to obtain a virtual object 81.

In addition, the user can also directly realize adjustment of a size of a virtual object through a stretching operation for the virtual object.

Figure 9:
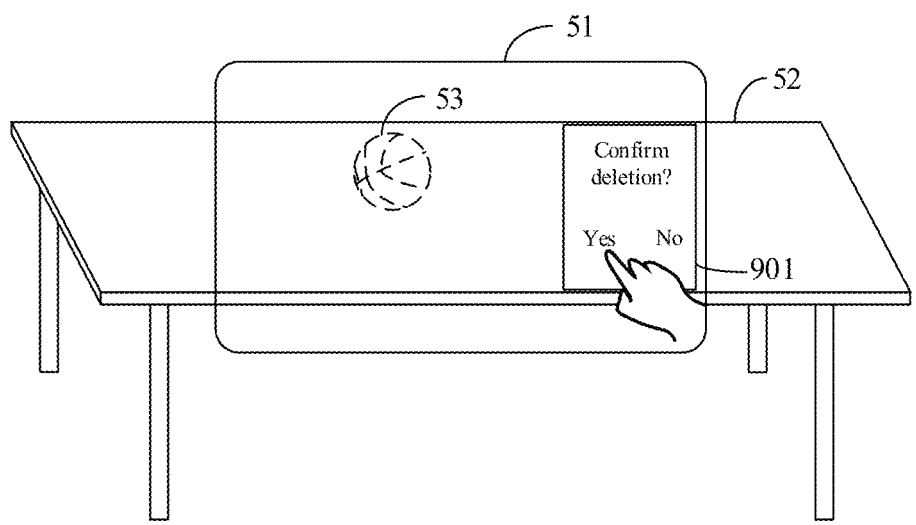
FIG. 9 shows a schematic view of a first terminal deleting a virtual object in response to a user's operation in an embodiment of the present disclosure.

FIG. 9 shows a schematic diagram of deleting a virtual object. Specifically, in response to a user's click operation on a deleting button in the editing sub-interface 500, a sub-interface 901 for confirming deletion is further displayed. After the user clicks a button for confirming deletion, the virtual object 53 can be deleted from the scene.

It should be understood that the description of editing operations in the above drawings is merely exemplary and should not be construed as any limitation of the present disclosure.

The first terminal can send edited results to the cloud for storage in the cloud.

In addition to the above-mentioned editing operations for existing virtual objects, the present disclosure also provides a solution for adding new virtual objects into a scene. Specifically, the first terminal can add a new virtual object in a scene where the first terminal is located in response to a virtual object adding operation, and send information of the new virtual object to the cloud; the cloud matches the information of the new virtual object with information of a map of the scene where the first terminal is currently located, that is, the information of the new virtual object can be associated with a current map ID.

Figure 10:
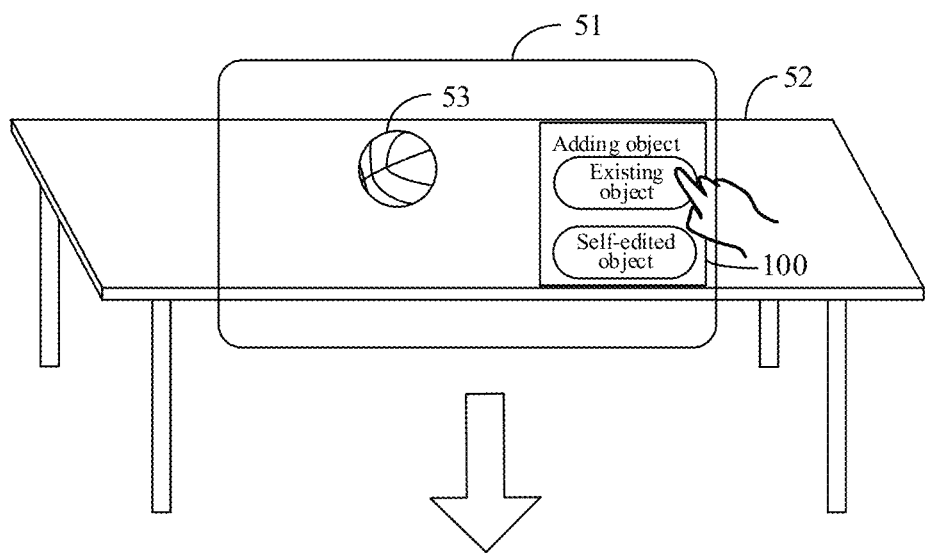
FIG. 10 shows a schematic view of a first terminal adding a new virtual object in a scene in response to a user's virtual object adding operation in an embodiment of the present disclosure.
Figure 10:
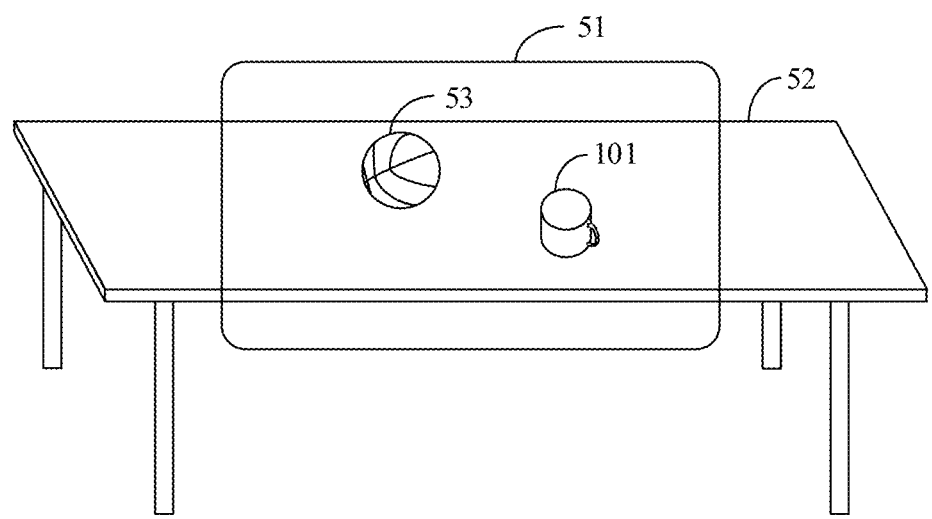

As shown in FIG. 10, an application is configured with an object adding button. After a user clicks the object adding button, an object adding sub-interface 100 can appear on an interface of the first terminal 51. In addition, the user can also present the object adding sub-interface 100 by a preset presentation rule (for example, double-clicking the screen, long-pressing the screen, etc.).

Based on the object adding sub-interface 100, the user can select one or more virtual objects from existing objects to add into a scene, or edit one or more new virtual objects by himself to add into a scene. In this case, the existing objects may include virtual objects pre-edited by developers and downloaded to the first terminal together with the AR application is downloaded, or the existing objects may be information of virtual objects shared by developers in the network. In addition, the existing objects also include virtual objects that have been edited in the user's history, which is not limited in this exemplary embodiment.

As shown in FIG. 10, in response to a user selecting an existing object or editing an object by himself, a new virtual object 101, such as a virtual cup, can be added into a scene.

According to some embodiments of the present disclosure, after acquiring information of an edited virtual object, the cloud may replace information of a virtual object stored before editing with the information of the edited virtual object. That is to say, the cloud only stores the latest editing results, and deletes editing results that may exist in the history.

According to other embodiments of the present disclosure, the cloud may simultaneously store information of edited virtual objects and information of virtual objects before editing.

Figure 11:
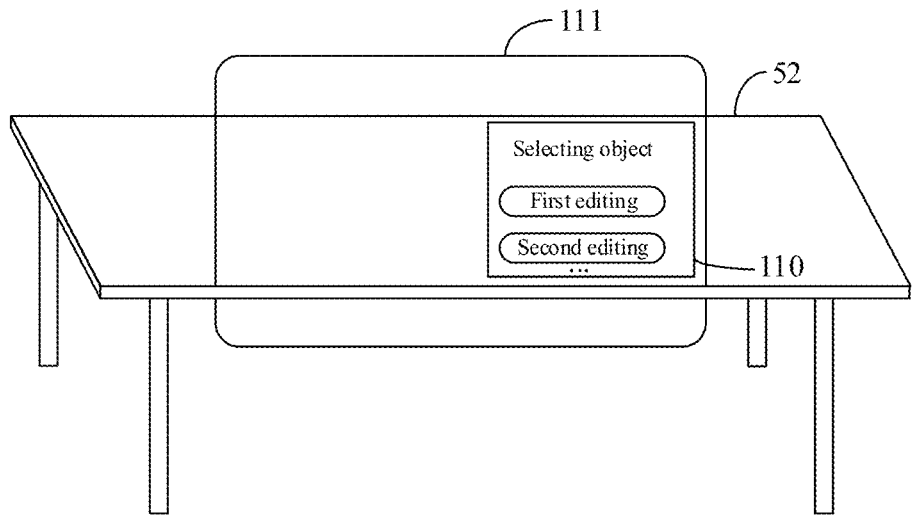
FIG. 11 shows a schematic view of a selection sub-interface on a third terminal presenting virtual objects before editing and after editing in an embodiment of the present disclosure.

As shown in FIG. 11, when the cloud needs to send information of a virtual object to a third terminal 111, the cloud can send both information of an edited virtual object and information of the virtual object before editing to the third terminal 111. An object selecting sub-interface 110 can be displayed on an interface of the third terminal 111. Next, a virtual object actually displayed on the interface can be determined in response to a user's selection operation for different editing results.

Figure 12:
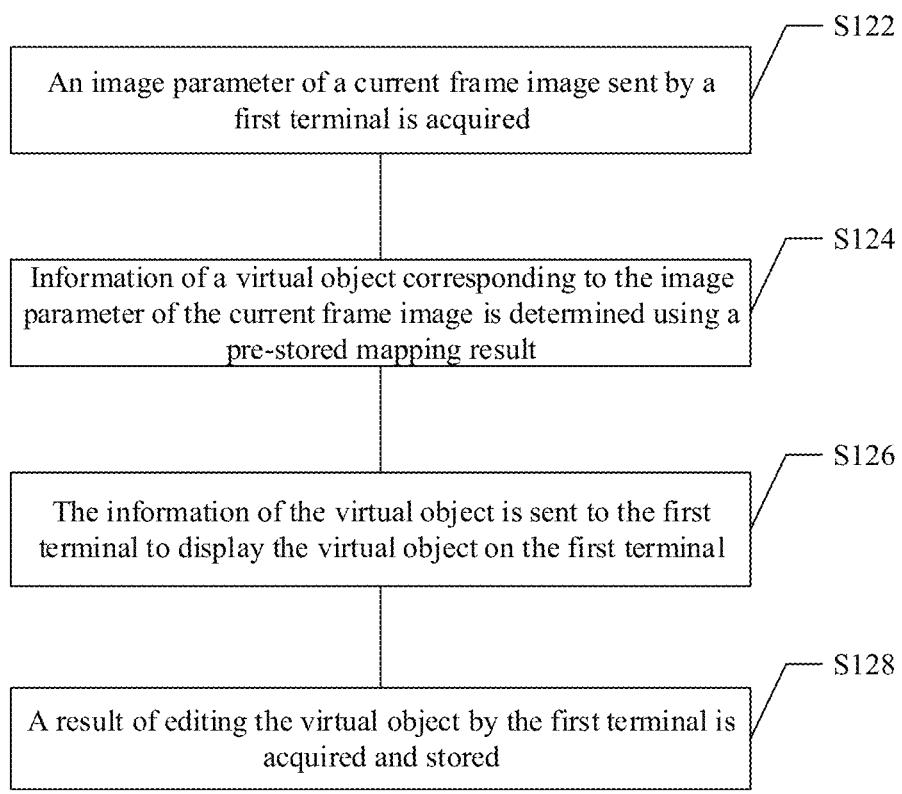
FIG. 12 schematically shows a flow chart of an augmented reality processing method according to another exemplary embodiment of the present disclosure.

FIG. 12 schematically shows a flow chart of an augmented reality processing method applicable to the cloud according to an exemplary embodiment of the present disclosure. As shown in FIG. 12, the augmented reality processing method can include the following operations.

S122, an image parameter of a current frame image sent by a first terminal is acquired.

S124, information of a virtual object corresponding to the image parameter of the current frame image is determined by using a pre-stored mapping result.

S126, the information of the virtual object is sent to the first terminal to display the virtual object on the first terminal.

S128, a result of editing the virtual object by the first terminal is acquired and stored.

Processes of the operation S122 to the operation S128 have been detailed in the above operation S32 to operation S36, and are not repeated here.

Figure 13:
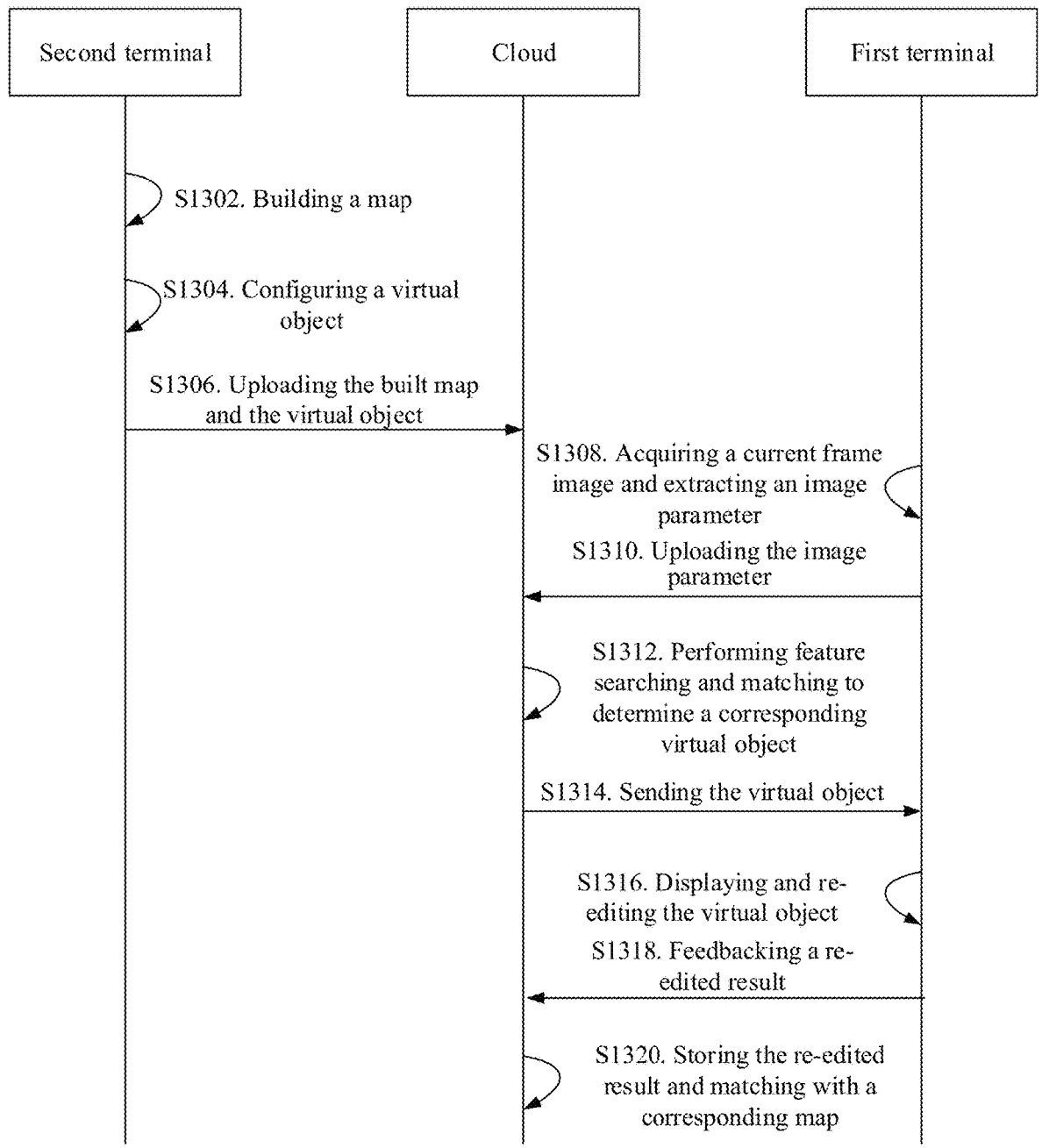
FIG. 13 schematically shows an interaction diagram of an augmented reality processing solution according to an exemplary embodiment of the present disclosure.

An interaction process of an augmented reality processing solution of an exemplary embodiment of the present disclosure will be described below with reference to FIG. 13.

In operation S1302, a second terminal builds a map for a scene to obtain map information of the current scene; in operation S1304, the second terminal and configures a virtual object in the scene in response to a user's operation of placing anchor point information. It can be understood that, in the same scene, the virtual object is associated with the map information. In operation S1306, the second terminal may upload the constructed map information and the information of the virtual object to the cloud.

In operation S1308, the first terminal acquires a current frame image captured by its camera module, and extracts an image parameter; in operation S1310, the first terminal uploads the extracted image parameter to the cloud.

In operation S1312, the cloud, by using a pre-stored mapping result including the map information uploaded by the second terminal, performs feature search and match for the image parameter uploaded by the first terminal, and determines a virtual object corresponding to the image parameter uploaded by the first terminal; in operation S1314, the cloud sends the determined virtual object to the first terminal.

In operation S1316, the first terminal displays the virtual object, and re-edits the virtual object in response to a user's operation; in operation S1318, the first terminal feedbacks a re-editing result to the cloud.

In operation S1320, the cloud stores the re-editing result and matches it with corresponding map information.

Figure 14:
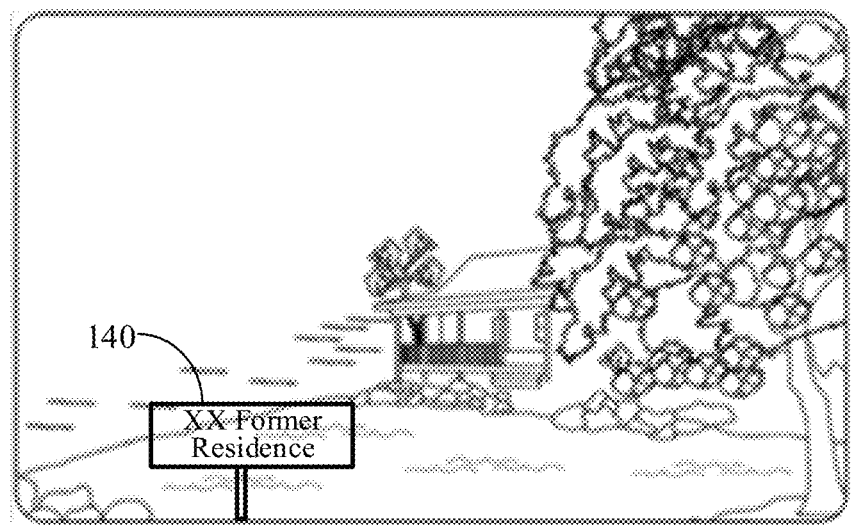
FIG. 14 shows a schematic view of effect of applying an augmented reality processing solution of an exemplary embodiment of the present disclosure.

FIG. 14 shows a schematic view of effect of applying an augmented reality processing solution of the present disclosure. Specifically, when a user arrives at a scene, he can use a mobile phone to open a multi-person AR application, and then can obtain information of the current scene through an interface. As shown in FIG. 14, an introduction board 140 of "XX Former Residence" is displayed.

Applied scenarios of the solution of the present disclosure are wide, for example, it is possible to perform virtual description of buildings, virtual display of restaurant evaluations, placement of virtual navigation icons for indoor shopping malls to facilitate subsequent users to find, and so on. The present disclosure does not limit this.

To sum up, when the augmented reality processing solution of the exemplary embodiment of the present disclosure is applied, in a first aspect, when acquiring information of a virtual object, a user does not need to input a room ID number, but the cloud determines the information of the virtual object by searching for a mapping result matching a current frame image; after the current frame image is determined, corresponding information of a virtual object is intelligently matched without the user's operation, and the convenience is improved. In a second aspect, compared with a solution that needs to input a room ID number to obtain a virtual object, in this solution of the present disclosure, the user does not need to memorize room ID numbers of different scenes; in a third aspect, this solution of the present disclosure can re-edit pre-configured virtual objects, which enhances fun of multi-person AR experience; in a fourth aspect, it is possible to use GPS and other means to locate corresponding map information, so as to quickly search images and determine virtual objects.

It should be noted that although various steps of the methods of the present disclosure are depicted in the drawings in a particular order, this does not require or imply that these steps must be performed in that particular order, or that all illustrated steps must be performed to achieve the desired the result. Additionally or alternatively, it is possible to omit certain steps, combine multiple steps into one step for execution, and/or decompose one step into multiple steps for execution, and so on.

Further, this exemplary embodiment further provides an augmented reality processing apparatus applicable to the first terminal.

Figure 15:
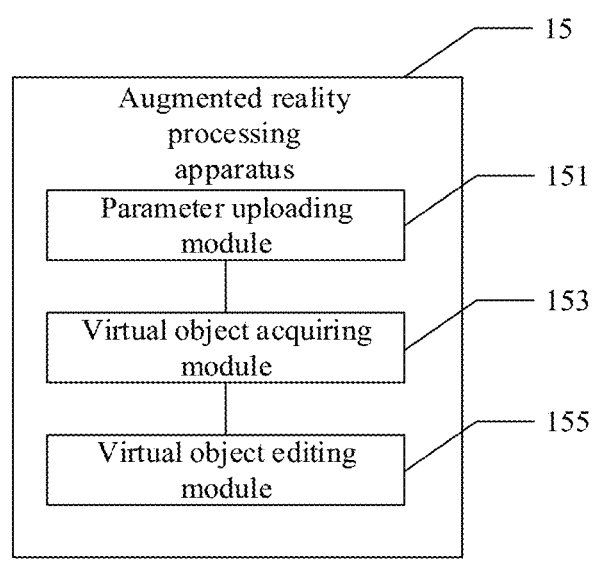
FIG. 15 schematically shows a block diagram of an augmented reality processing apparatus according to a first exemplary embodiment of the present disclosure.

FIG. 15 schematically shows a block diagram of an augmented reality processing apparatus applicable to a first terminal according to an exemplary embodiment of the present disclosure. As shown in FIG. 15, the augmented reality processing apparatus 15 applicable to a first terminal according to an exemplary embodiment of the present disclosure can include a parameter uploading module 151, a virtual object acquiring module 153, and a virtual object editing module 155.

Specifically, the parameter uploading module 151 can be used to obtain a current frame image captured by a camera module of the first terminal, extract an image parameter of the current frame image, and send the image parameter to the cloud, so that the cloud determines, by using a pre-stored mapping result, information of a virtual object corresponding to the image parameter; the virtual object acquiring module 153 can be used to receive the information of the virtual object sent by the cloud and display the virtual object; and the virtual object editing module 155 can be used to edit the virtual object in response to an editing operation for the virtual object.

Based on the augmented reality processing apparatus applicable to the first terminal according to the exemplary embodiment of the present disclosure, in a first aspect, when acquiring information of a virtual object, a user does not need to input a room ID number, but the cloud determines the information of the virtual object by searching for a mapping result matching a current frame image; after the current frame image is determined, corresponding information of a virtual object is intelligently matched without the user's operation, and the convenience is improved. In a second aspect, compared with a solution that needs to input a room ID number to obtain a virtual object, in this solution of the present disclosure, the user does not need to memorize room ID numbers of different scenes; in a third aspect, this solution of the present disclosure can re-edit pre-configured virtual objects, which enhances fun of multi-person AR experience.

According to an exemplary embodiment of the present disclosure, the virtual object editing module 155 can further feedback editing results to the cloud.

Figure 16:
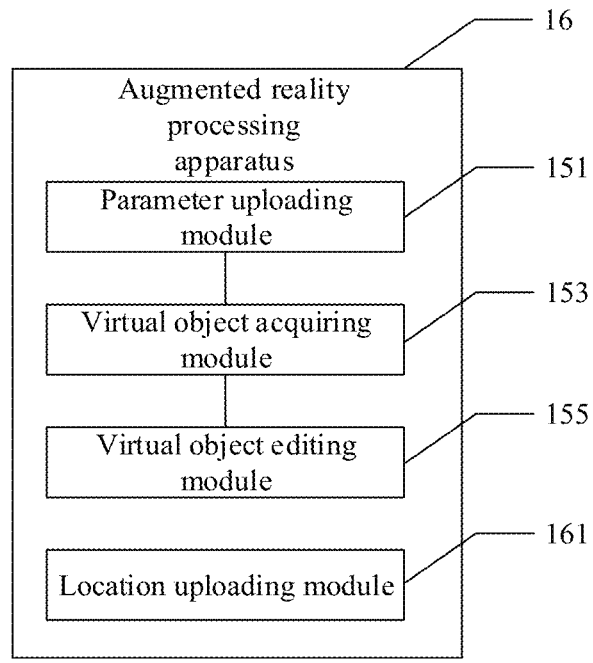
FIG. 16 schematically shows a block diagram of an augmented reality processing apparatus according to a second exemplary embodiment of the present disclosure.

According to an exemplary embodiment of the present disclosure, as shown in FIG. 16, compared with the augmented reality processing apparatus 15, an augmented reality processing apparatus 16 can further include a location uploading module 161.

Specifically, the location uploading module 161 can be configured to execute: acquiring location information of a scene where the first terminal is located; sending the location information to the cloud, so that the cloud determines a search range for a mapping result and determines information of a virtual object corresponding to the image parameter using the mapping result within the search range.

According to an exemplary embodiment of the present disclosure, the virtual object editing module 155 can be configured to execute: on an interface of the first terminal, displaying an editing sub-interface of the virtual object in response to a selecting operation for the virtual object; and editing the virtual object in response to an editing operation on the editing sub-interface.

According to an exemplary embodiment of the present disclosure, types of editing the virtual object include: at least one of deleting the virtual object, moving the virtual object, rotating the virtual object, and modifying attributes of the virtual object.

Figure 17:
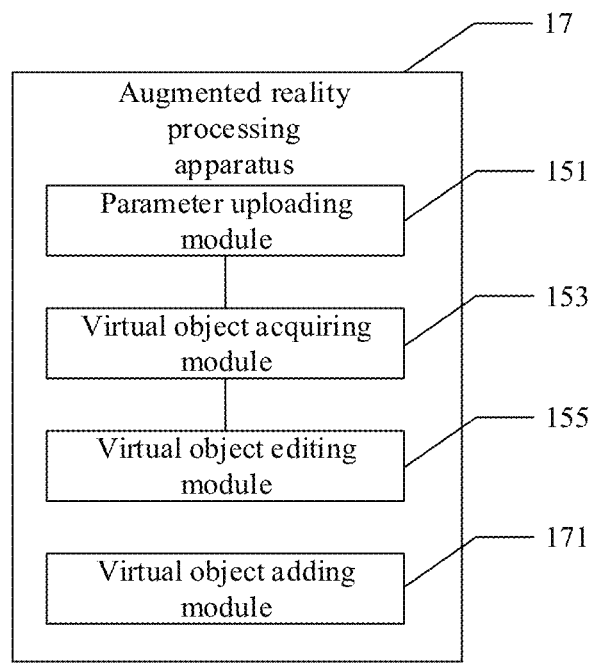
FIG. 17 schematically shows a block diagram of an augmented reality processing apparatus according to a third exemplary embodiment of the present disclosure.

According to an exemplary embodiment of the present disclosure, as shown in FIG. 17, compared with the augmented reality processing apparatus 15, an augmented reality processing apparatus 17 can further include a virtual object adding module 171.

Specifically, the virtual object adding module 171 can be configured to execute: adding a new virtual object into a scene where the first terminal is located in response to a virtual object adding operation; and sending information of the new virtual object to the cloud.

According to an exemplary embodiment of the present disclosure, the image parameter includes two-dimensional feature point information and three-dimensional feature point information of the current frame image. On this condition, a process of extracting the image parameter of the current frame image by the parameter uploading module 151 can be configured to execute: performing two-dimensional feature point extraction for the current image frame to determine two-dimensional feature point information of the current frame image; acquiring depth information corresponding to the two-dimensional feature point information, and determining three-dimensional feature point information of the current frame image according to the two-dimensional feature point information and the depth information corresponding to the two-dimensional feature point information.

According to an exemplary embodiment of the present disclosure, the parameter uploading module 151 can further be configured to execute: acquiring the depth information corresponding to the current frame image captured by a depth sensing module of the first terminal; performing registration between the current frame image and the depth information corresponding to the current frame image to determine depth information of each pixel on the current frame image; determining the depth information corresponding to the two-dimensional feature point information from the depth information of each pixel on the current frame image; and determining three-dimensional feature point information of the current frame image using the two-dimensional feature point information and the depth information corresponding to the two-dimensional feature point information.

Furthermore, exemplary embodiments further provide an augmented reality processing apparatus applicable to the cloud.

Figure 18:
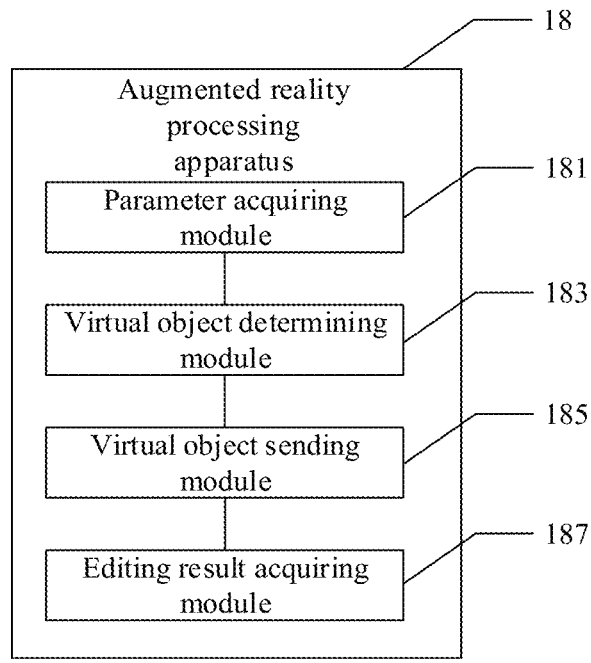
FIG. 18 schematically shows a block diagram of an augmented reality processing apparatus according to a fourth exemplary embodiment of the present disclosure.

FIG. 18 schematically shows a block diagram of an augmented reality processing apparatus applicable to the cloud according to an exemplary embodiment of the present disclosure. As shown in FIG. 18, an augmented reality processing apparatus 18 applicable to the cloud according to an exemplary embodiment of the present disclosure can include a parameter acquiring module 181, a virtual object determining module 183, a virtual object sending module 185, and an editing result acquiring module 187.

Specifically, the parameter acquiring module 181 can be used to acquire an image parameter of a current frame image sent by a first terminal; the virtual object determining module 183 can be used to determine, by using a pre-stored mapping result, information of a virtual object corresponding to the image parameter of the current frame image; the virtual object sending module 185 can be used to send the information of the virtual object to the first terminal to display the virtual object on the first terminal; and the editing result acquiring module 187 can be used to acquire and store a result of editing the virtual object by the first terminal.

Based on the augmented reality processing apparatus applicable to the cloud according to the exemplary embodiment of the present disclosure, in a first aspect, when acquiring information of a virtual object, a user does not need to input a room ID number, but the cloud determines the information of the virtual object by searching for a mapping result matching a current frame image; after the current frame image is determined, corresponding information of a virtual object is intelligently matched without the user's operation, and the convenience is improved. In a second aspect, compared with a solution that needs to input a room ID number to obtain a virtual object, in this solution of the present disclosure, the user does not need to memorize room ID numbers of different scenes; in a third aspect, this solution of the present disclosure can re-edit pre-configured virtual objects, which enhances fun of multi-person AR experience.

According to an exemplary embodiment of the present disclosure, the virtual object determining module 183 can be configured to execute: acquiring location information of a scene where the first terminal is located; determining a search range for a mapping result corresponding to the location information; and determining information of a virtual object corresponding to the image parameter of the current frame image using the mapping result within the search range.

According to an exemplary embodiment of the present disclosure, the virtual object determining module 183 can be configured to execute: choosing a reference image that matches the image parameter of the current frame image from the pre-stored mapping result, and determining a second terminal that shoots the reference image; determining a posture of the current frame image relative to the second terminal using the image parameter of the current frame image and an image parameter of the reference image; determining a relative posture relationship between the first terminal and the second terminal according to the posture of the current frame image relative to the second terminal and posture information of the first terminal when capturing the current frame image; and determining information of a virtual object corresponding to the image parameter of the current frame image using the relative posture relationship between the first terminal and the second terminal and in combination with information of a virtual object configured by the second terminal during map construction.

According to an exemplary embodiment of the present disclosure, the virtual object determining module 183 can be configured to execute: if the two-dimensional feature point information of the current frame image matches the two-dimensional feature point information of the reference image, determining a relative posture relationship between the three-dimensional feature point information of the current frame image and the three-dimensional feature of the reference image using an iterative closest point method, thereby obtaining a posture of the current frame image relative to the second terminal.

According to an exemplary embodiment of the present disclosure, the virtual object determining module 183 can be configured to execute: determining mismatched feature point information in the two-dimensional feature point information of the current frame image and the two-dimensional feature point information of the reference image; removing the mismatched feature point information from the three-dimensional feature point information of the current frame image, thereby determining a relative posture relationship between the three-dimensional feature point information of the current frame image after removing the mismatched feature point information and the three-dimensional feature point information of the reference image after removing the mismatched feature point information.

According to an exemplary embodiment of the present disclosure, the virtual object determining module 183 can be configured to execute: if the two-dimensional feature point information of the current frame image matches the two-dimensional feature point information of the reference image, associating the two-dimensional feature point information of the current frame image with the three-dimensional feature point information of the reference image to obtain point pair information; using the point pair information to solve the Perspective-n-Point problem, and determining a posture of the current frame image relative to the second terminal according to the three-dimensional feature point information of the current frame image and in combination with a solution result.

According to an exemplary embodiment of the present disclosure, the virtual object determining module 183 can be configured to execute: determining a relative posture relationship between the three-dimensional feature point information of the current frame image and the three-dimensional feature point information of the reference image according to the solution result; using the relative posture relationship between the three-dimensional feature point information of the current frame image and the three-dimensional feature point information of the reference image determined according to the solution result as an initial pose to input, and using the iterative closest point method to determine the relative posture relationship between the three-dimensional feature point information of the current frame image and the three-dimensional feature point information of the reference image, thereby determining the posture of the current frame image relative to the second terminal.

Figure 19:
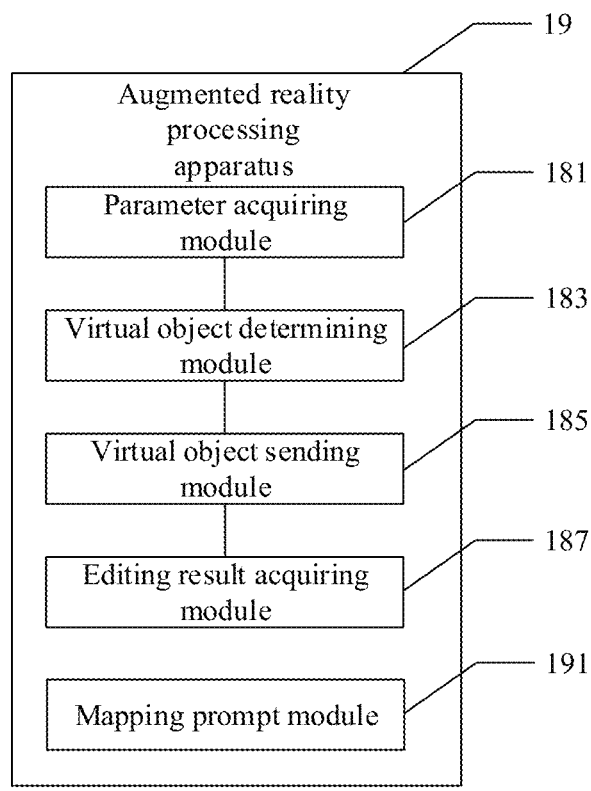
FIG. 19 schematically shows a block diagram of an augmented reality processing apparatus according to a fifth exemplary embodiment of the present disclosure.

According to an exemplary embodiment of the present disclosure, as shown in FIG. 19, compared with the augmented reality processing apparatus 18, an augmented reality processing apparatus 19 can further include a mapping prompt module 191.

Specifically, the mapping prompt module 191 can be configured to execute: if there is no reference image matching the image parameter of the current frame image in the pre-stored mapping result, sending a mapping prompt to the first terminal to prompt the first terminal to perform a map construction process for a current scene.

According to an exemplary embodiment of the present disclosure, the virtual object sending module 185 can be configured to execute: determining acquisition authority of the information of the virtual object; if the first terminal meets the acquisition authority, executing a process of sending the information of the virtual object to the first terminal; if the first terminal does not meet the acquisition authority, sending an authority error prompt to the first terminal.

According to an exemplary embodiment of the present disclosure, the virtual object sending module 185 can be configured to execute: acquiring an identification of the first terminal; if the identification of the first terminal is in an identification whitelist, determining that the first terminal meets the acquisition authority; if the identification of the first terminal is not in the identification whitelist, determining that the first terminal does not meet the acquisition authority.

Figure 20:
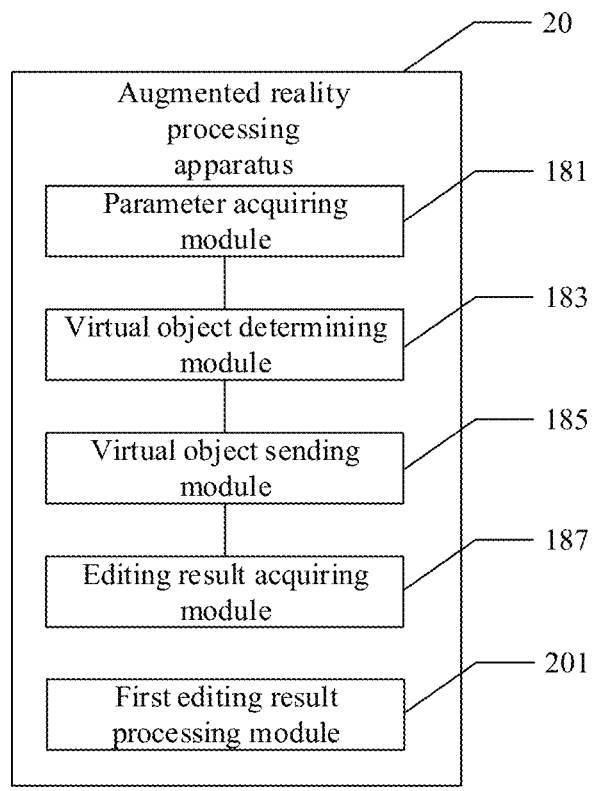
FIG. 20 schematically shows a block diagram of an augmented reality processing apparatus according to a sixth exemplary embodiment of the present disclosure.

According to an exemplary embodiment of the present disclosure, as shown in FIG. 20, compared with the augmented reality processing apparatus 18, an augmented reality processing apparatus 20 can further include a first editing result processing module 201.

Specifically, the first editing result processing module 201 can be configured to execute: after acquiring a result of editing the virtual object by the first terminal, replacing information of the virtual object before editing by information of the edited virtual object.

Figure 21:
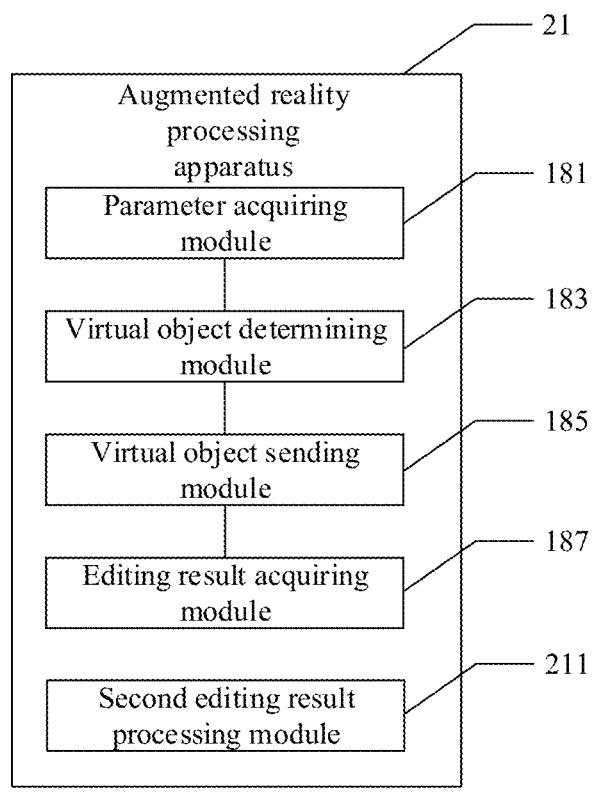
FIG. 21 schematically shows a block diagram of an augmented reality processing apparatus according to a seventh exemplary embodiment of the present disclosure.

According to an exemplary embodiment of the present disclosure, as shown in FIG. 21, compared with the augmented reality processing apparatus 18, an augmented reality processing apparatus 21 can further include a second editing result processing module 211.

Specifically, the second editing result processing module 201 can be configured to execute: when needing to send the information of the virtual object to a third terminal, sending both the information of the edited virtual object and the information of the virtual object before editing to the third terminal, and thereby displaying the information of the edited virtual object or the information of the virtual object before editing on the third terminal in response to a virtual object selecting operation.

Figure 22:
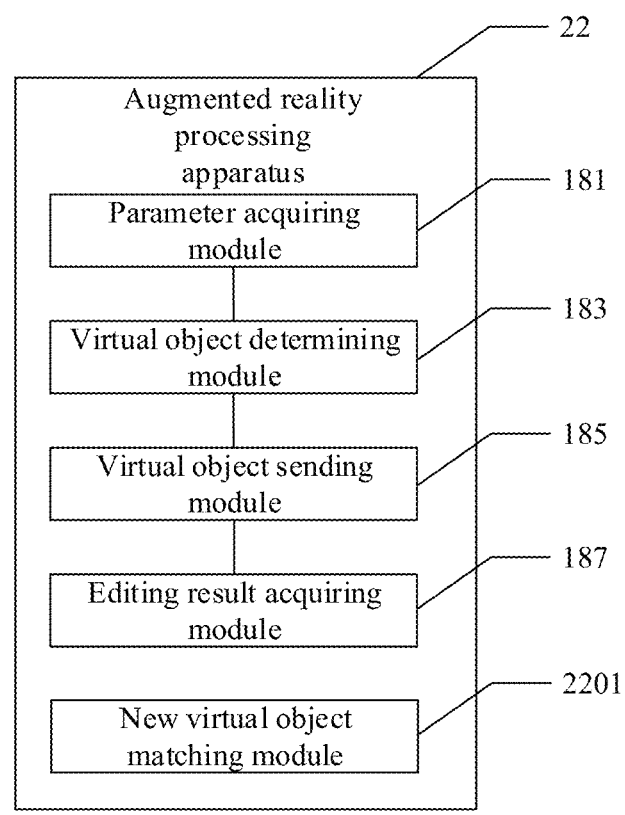
FIG. 22 schematically shows a block diagram of an augmented reality processing apparatus according to an eighth exemplary embodiment of the present disclosure.

According to an exemplary embodiment of the present disclosure, as shown in FIG. 22, compared with the augmented reality processing apparatus 18, an augmented reality processing apparatus 22 can further include a new virtual object matching module 2201.

Specifically, the new virtual object matching module 2201 can be configured to execute: acquiring information of a new virtual object sent from the first terminal; and matching the information of the new virtual object with map information of a scene where the first terminal is located.

Since the function modules of the augmented reality processing apparatuses of the embodiments of the present disclosure are similar to the above method embodiments, they are not repeated here.

In some aspects, an augmented reality processing method applicable to a first terminal, comprising: obtaining a current frame image, extracting an image parameter of the current frame image, receiving information of a virtual object and displaying the virtual object; and editing the virtual object in response to an editing operation for the virtual object. The information of the virtual object corresponds to the image parameter of the current frame image and is determined by using a pre-stored mapping result.

In some embodiments, the edited virtual object is displayable in another terminal.

In some embodiments, the current frame image is captured by a first terminal, and the augmented reality processing method further comprises: acquiring location information of a scene where the first terminal is located; and sending the location information to a server. The location information is configured to allow the server to determine a search range for the mapping result according to the location information and determine the information of the virtual object corresponding to the image parameter using the mapping result within the search range.

In some embodiments, the current frame image is captured by a first terminal, and the editing the virtual object in response to an editing operation for the virtual object comprises: displaying, on an interface of the first terminal, an editing sub-interface of the virtual object in response to a selecting operation for the virtual object; and editing the virtual object in response to an editing operation on the editing sub-interface.

In some embodiments, the current frame image is captured by a first terminal, and the augmented reality processing method further comprises: adding a new virtual object into a scene where the first terminal is located in response to a virtual object adding operation; and sending information of the new virtual object to a server for storage.

In some embodiments, the image parameter comprises two-dimensional feature point information and three-dimensional feature point information of the current frame image. The extracting an image parameter of a current frame image comprises: performing two-dimensional feature point extraction for the current image frame and determining the two-dimensional feature point information of the current frame image; acquiring depth information corresponding to the two-dimensional feature point information, and determining the three-dimensional feature point information of the current frame image according to the two-dimensional feature point information and the depth information corresponding to the two-dimensional feature point information.

In some embodiments, the acquiring depth information corresponding to the two-dimensional feature point information, and determining the three-dimensional feature point information of the current frame image according to the two-dimensional feature point information and the depth information corresponding to the two-dimensional feature point information comprises: acquiring the depth information corresponding to the current frame image; performing registration between the current frame image and the depth information corresponding to the current frame image to determine depth information of each pixel on the current frame image; determining the depth information corresponding to the two-dimensional feature point information from the depth information of each pixel on the current frame image; and determining the three-dimensional feature point information of the current frame image using the two-dimensional feature point information and the depth information corresponding to the two-dimensional feature point information.

In some embodiments, the current frame image is captured by a first terminal, and the information of the virtual object corresponding to the image parameter of the current frame image is determined by using a relative posture relationship between the first terminal and a second terminal and in combination with information of a virtual object configured by the second terminal during map construction. The second terminal is configured to shoot a reference image chosen from the pre-stored mapping result and matching the image parameter of the current frame image. A posture of the current frame image relative to the second terminal is determined by using the image parameter of the current frame image and an image parameter of the reference image. The relative posture relationship between the first terminal and the second terminal is determined according to the posture of the current frame image relative to the second terminal and posture information of the first terminal when capturing the current frame image.

In some embodiments, the image parameter of the current frame image comprises two-dimensional feature point information and three-dimensional feature point information of the current frame image, and the image parameter of the reference image comprises two-dimensional feature point information and three-dimensional feature point information of the reference image. In response to the two-dimensional feature point information of the current frame image matching the two-dimensional feature point information of the reference image, a posture of the current frame image relative to the second terminal is obtained by using a relative posture relationship between the three-dimensional feature point information of the current frame image and the three-dimensional feature of the reference image which is determined by using an iterative closest point method.

In some embodiments, the three-dimensional feature point information of the current frame image is three-dimensional feature point information from which mismatched feature point information has been removed, and the relative posture relationship between the three-dimensional feature point information and the three-dimensional feature point information of the reference image is determined by using the three-dimensional feature point information from which the mismatched feature point information has been removed and the three-dimensional feature point information of the reference image from which the mismatched feature point information has been removed. The mismatched feature point information is determined according to the two-dimensional feature point information of the current frame image and the two-dimensional feature point information of the reference image.

In some embodiments, the image parameter of the current frame image comprises two-dimensional feature point information and three-dimensional feature point information of the current frame image, and the image parameter of the reference image comprises two-dimensional feature point information and three-dimensional feature point information of the reference image. The posture of the current frame image relative to the second terminal is determined by using the three-dimensional feature point information of the current frame image and in combination with a solution result of a Perspective-n-Point problem solved by using point pair information. The point pair information is obtained by associating the two-dimensional feature point information of the current frame image with the three-dimensional feature point information of the reference image in response to the two-dimensional feature point information of the current frame image matching the two-dimensional feature point information of the reference image.

In some embodiments, the posture of the current frame image relative to the second terminal is determined by a revised relative posture relationship between the three-dimensional feature point information of the current frame image and the three-dimensional feature point information of the reference image. The revised relative posture relationship is determined by using an original relative posture relationship between the three-dimensional feature point information of the current frame image and the three-dimensional feature point information of the reference image determined according to the solution result as an initial pose to input, and further using an iterative closest point method.

In some embodiments, the augmented reality processing method further comprises: in response to no reference image matching the image parameter of the current frame image existing in the pre-stored mapping result, receiving a mapping prompt and performing a map construction process for a current scene according to the mapping prompt.

In some embodiments, the current frame image is captured by a first terminal, an acquisition authority of the first terminal to the information of the virtual object is verified by the server, an acquisition authority of the first terminal on the information of the virtual object is verified, and the augmented reality processing method further comprises: in response to the first terminal meeting the acquisition authority, displaying the virtual object according to the information of the virtual object; and in response to the first terminal failing to meet the acquisition authority, receiving an authority error prompt.

In some embodiments, the information of the virtual object is sent by a server, the acquisition authority comprises an identification whitelist, and the augmented reality processing method further comprises: sending an identification of the first terminal to the server, and the server is configured to determine that the first terminal meets the acquisition authority in response to the identification of the first terminal being in the identification whitelist, and further determine that the first terminal fails to meet the acquisition authority in response to the identification of the first terminal being beyond the identification whitelist.

In some embodiments, after editing the virtual object in response to the editing operation for the virtual object, the augmented reality processing method further comprises: sending information of the edited virtual object to the server, and the server is configured to replace the information of the virtual object before editing by information of the edited virtual object.

In some embodiments, after editing the virtual object in response to the editing operation for the virtual object, the augmented reality processing method further comprises: sending the information of the virtual object to a server. The server is configured to send both the information of the edited virtual object and the information of the virtual object before editing to a third terminal, and the third terminal is configured to display the information of the edited virtual object or the information of the virtual object before editing in response to a virtual object selecting operation.

In some aspects, a non-transitory computer-readable storage medium is provided, which stores a computer program. The program, when being executed by a processor, implements operations of: obtaining a current frame image; extracting an image parameter of the current frame image; receiving information of a virtual object and displaying the virtual object; and editing the virtual object in response to an editing operation for the virtual object. The information of the virtual object corresponds to the image parameter of the current frame image and is determined by using a pre-stored mapping result.

In some aspects, an electronic device, comprising: a processor; and a memory, configured to store one or more program; wherein when the one or more program is executed by a processor, the processor is enabled to implement the aforesaid augmented reality processing method.

From the description of the above embodiments, those skilled in the art can easily understand that the exemplary embodiments described herein may be implemented by software, and may also be implemented by software combined with necessary hardware. Therefore, the technical solution according to the embodiments of the present disclosure may be embodied in the form of a software product, and the software product may be stored in a non-volatile storage medium (which may be a CD-ROM, U disk, mobile hard disk, etc.) or on a network, and include instructions to enable a computing device (which may be a personal computer, a server, a terminal device, or a network device, etc.) to execute the methods according to the embodiments of the present disclosure.

In addition, the above-mentioned drawings are merely schematic illustrations of the processes included in the methods according to the exemplary embodiments of the present disclosure, and are not intended to be limiting. It is easy to understand that the processes shown in the above drawings do not indicate or limit the chronological order of these processes. In addition, it is also easy to understand that these processes may be performed synchronously or asynchronously, for example, in multiple modules.

It should be noted that although multiple modules or units of the apparatuses for action performance are mentioned in the above detailed description, this division is not mandatory. Indeed, according to embodiments of the present disclosure, features and functions of two or more modules or units described above may be embodied in one module or unit. Conversely, features and functions of one module or unit described above may be further divided into multiple modules or units to be embodied.

Other embodiments of the present disclosure will readily suggest themselves to those skilled in the art upon consideration of the specification and practice of what is disclosed herein. The present application is intended to cover any variations, uses, or adaptations of the present disclosure, and these variations, uses, or adaptations follow general principles of the present disclosure and include common knowledge or commonly used technical means in the technical field not disclosed by the present disclosure. The specification and examples are only regarded as exemplary, with the true scope and spirit of the disclosure being indicated by the claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. An augmented reality processing method, comprising:
   obtaining, by a first terminal, a current frame image;
   extracting, by the first terminal, an image parameter of the current frame image;
   receiving, by the first terminal, information of a virtual object and displaying the virtual object, wherein the virtual object is configured or edited by a second terminal before the virtual object is received by the first terminal, and the information of the virtual object corresponds to the image parameter of the current frame image and is determined by using a pre-stored mapping result; and
   editing, by the first terminal, the virtual object in response to an editing operation for the virtual object to obtain an edited virtual object, and wherein the edited virtual object is displayable on and editable by the second terminal.

2. The augmented reality processing method according to claim 1, wherein the current frame image is captured by the first terminal, and the augmented reality processing method further comprises:
   acquiring, by the first terminal, location information of a scene where the first terminal is located; and
   sending, by the first terminal, the location information to a server;
   wherein the location information is configured to allow the server to determine a search range for the mapping result according to the location information and determine the information of the virtual object corresponding to the image parameter using the mapping result within the search range.

3. The augmented reality processing method according to claim 1, wherein the current frame image is captured by the first terminal, and the editing the virtual object in response to an editing operation for the virtual object comprises:
   displaying, on an interface of the first terminal, an editing sub-interface of the virtual object in response to a selecting operation for the virtual object; and
   editing, by the first terminal, the virtual object in response to an editing operation on the editing sub-interface.

4. The augmented reality processing method according to claim 1, wherein the current frame image is captured by the first terminal, and the augmented reality processing method further comprises:
   adding, by the first terminal, a new virtual object into a scene where the first terminal is located in response to a virtual object adding operation; and
   sending, by the first terminal, information of the new virtual object to a server for storage.

5. The augmented reality processing method according to claim 1, wherein the image parameter comprises two-dimensional feature point information and three-dimensional feature point information of the current frame image; wherein the extracting the image parameter of the current frame image comprises:
   performing, by the first terminal, two-dimensional feature point extraction for the current image frame and determining the two-dimensional feature point information of the current frame image;
   acquiring, by the first terminal, depth information corresponding to the two-dimensional feature point information; and
   determining, by the first terminal, the three-dimensional feature point information of the current frame image according to the two-dimensional feature point information and the depth information corresponding to the two-dimensional feature point information.

6. The augmented reality processing method according to claim 5, wherein the acquiring depth information corresponding to the two-dimensional feature point information, and determining the three-dimensional feature point information of the current frame image according to the two-dimensional feature point information and the depth information corresponding to the two-dimensional feature point information comprises:
   acquiring, by the first terminal, the depth information corresponding to the current frame image;
   performing, by the first terminal, registration between the current frame image and the depth information corresponding to the current frame image to determine depth information of each pixel on the current frame image;
   determining, by the first terminal, the depth information corresponding to the two-dimensional feature point information from the depth information of each pixel on the current frame image; and
   determining, by the first terminal, the three-dimensional feature point information of the current frame image using the two-dimensional feature point information and the depth information corresponding to the two-dimensional feature point information.

7. The augmented reality processing method according to claim 1, wherein the current frame image is captured by the first terminal, and the information of the virtual object corresponding to the image parameter of the current frame image is determined by using a relative posture relationship between the first terminal and the second terminal and in combination with information of a virtual object configured by the second terminal during map construction;

wherein the second terminal is configured to shoot a reference image chosen from the pre-stored mapping result and matching the image parameter of the current frame image;

wherein a posture of the current frame image relative to the second terminal is determined by using the image parameter of the current frame image and an image parameter of the reference image; and wherein the relative posture relationship between the first terminal and the second terminal is determined according to the posture of the current frame image relative to the second terminal and posture information of the first terminal when capturing the current frame image.

8. The augmented reality processing method according to claim 7, wherein the image parameter of the current frame image comprises two-dimensional feature point information and three-dimensional feature point information of the current frame image, and the image parameter of the reference image comprises two-dimensional feature point information and three-dimensional feature point information of the reference image;

wherein in response to the two-dimensional feature point information of the current frame image matching the two-dimensional feature point information of the reference image, a posture of the current frame image relative to the second terminal is obtained by using a relative posture relationship between the three-dimensional feature point information of the current frame image and the three-dimensional feature of the reference image which is determined by using an iterative closest point method;

wherein the three-dimensional feature point information of the current frame image is three-dimensional feature point information from which mismatched feature point information has been removed, and the relative posture relationship between the three-dimensional feature point information and the three-dimensional feature point information of the reference image is determined by using the three-dimensional feature point information from which the mismatched feature point information has been removed and the three-dimensional feature point information of the reference image from which the mismatched feature point information has been removed; and wherein the mismatched feature point information is determined according to the two-dimensional feature point information of the current frame image and the two-dimensional feature point information of the reference image.

9. The augmented reality processing method according to claim 7, wherein the image parameter of the current frame image comprises two-dimensional feature point information and three-dimensional feature point information of the current frame image, and the image parameter of the reference image comprises two-dimensional feature point information and three-dimensional feature point information of the reference image; wherein the posture of the current frame image relative to the second terminal is determined by using the three-dimensional feature point information of the current frame image and in combination with a solution result of a Perspective-n-Point problem solved by using point pair information; and wherein the point pair information is obtained by associating the two-dimensional feature point information of the current frame image with the three-dimensional feature point information of the reference image in response to the two-dimensional feature point information of the current frame image matching the two-dimensional feature point information of the reference image.

10. The augmented reality processing method according to claim 9, wherein the posture of the current frame image relative to the second terminal is determined by a revised relative posture relationship between the three-dimensional feature point information of the current frame image and the three-dimensional feature point information of the reference image; and wherein the revised relative posture relationship is determined by using an original relative posture relationship between the three-dimensional feature point information of the current frame image and the three-dimensional feature point information of the reference image determined according to the solution result as an initial pose to input, and further using an iterative closest point method.

11. The augmented reality processing method according to claim 7, further comprising:

in response to no reference image matching the image parameter of the current frame image existing in the pre-stored mapping result, receiving, by the first terminal, a mapping prompt and performing a map construction process for a current scene according to the mapping prompt.

12. The augmented reality processing method according to claim 1, wherein the current frame image is captured by the first terminal, an acquisition authority of the first terminal on the information of the virtual object is verified, and the augmented reality processing method further comprises:

in response to the first terminal meeting the acquisition authority, displaying, by the first terminal, the virtual object according to the information of the virtual object; and in response to the first terminal failing to meet the acquisition authority, receiving, by the first terminal, an authority error prompt.

13. The augmented reality processing method according to claim 12, wherein the information of the virtual object is sent by a server, the acquisition authority comprises an identification whitelist, and the augmented reality processing method further comprises:

sending an identification of the first terminal to the server, and the server is configured to determine that the first terminal meets the acquisition authority in response to the identification of the first terminal being in the identification whitelist, and determine that the first terminal fails to meet the acquisition authority in response to the identification of the first terminal being beyond the identification whitelist.

14. The augmented reality processing method according to claim 1, wherein after editing the virtual object in response to the editing operation for the virtual object, the augmented reality processing method further comprises:

sending, by the first terminal, information of the edited virtual object to a server, and the server is configured to replace the information of the virtual object before editing by information of the edited virtual object.

15. The augmented reality processing method according to claim 1, wherein after editing the virtual object in response to the editing operation for the virtual object, the augmented reality processing method further comprises:

sending, by the first terminal, the information of the virtual object to a server, wherein the server is configured to send both the information of the edited virtual object and the information of the virtual object before editing to a third terminal, and the third terminal is configured to display the information of the edited virtual object or the information of the virtual object before editing in response to a virtual object selecting operation.

16. The augmented reality processing method according to claim 1, wherein the augmented reality processing method further comprises:

building, by the second terminal, one or more maps for a current scene to obtain map information of the current scene, and each of the one or more maps comprises a key frame image;

configuring one or more pre-configured virtual objects in the current scene in response to an operation of placing anchor point information, wherein the one or more pre-configured virtual objects are associated with the map information; and uploading the map information and the information of the pre-configured virtual objects to a server; and wherein the pre-stored mapping result comprises the uploaded map information, and the virtual object received by the first terminal are determined by using a target key frame image selected among one or more key frame images of the one or more maps and matching the current frame image.

17. A non-transitory computer-readable storage medium storing a computer program, wherein the program, when being executed by a processor, implements operations of:

obtaining, by a first terminal, a current frame image;

extracting, by the first terminal, an image parameter of the current frame image;

receiving, by the first terminal, information of a virtual object and displaying the virtual object, wherein the virtual object is configured or edited by a second terminal before the virtual object is received by the first terminal, and the information of the virtual object corresponds to the image parameter of the current frame image and is determined by using a pre-stored mapping result; and editing, by the first terminal, the virtual object in response to an editing operation for the virtual object to obtain an edited virtual object, and wherein the edited virtual object is displayable on and editable by the second terminal.

18. An electronic device, comprising:

a processor; and a memory, configured to store one or more program; wherein when the one or more program is executed by a processor, the processor is enabled to implement an augmented reality processing method comprising:

obtaining, by a first terminal, a current frame image;

extracting, by the first terminal, an image parameter of the current frame image;

receiving, by the first terminal, information of a virtual object and displaying the virtual object, wherein the virtual object is configured or edited by a second terminal before the virtual object is received by the first terminal, and the information of the virtual object corresponds to the image parameter of the current frame image and is determined by using a pre-stored mapping result; and editing, by the first terminal, the virtual object in response to an editing operation for the virtual object to obtain an edited virtual object, and wherein the edited virtual object is displayable on and editable by the second terminal.

19. The electronic device according to claim 18, wherein the current frame image is captured by the first terminal, and the augmented reality processing method further comprises:

acquiring, by the first terminal, location information of a scene where the first terminal is located; and sending, by the first terminal, the location information to a server;

wherein the location information is configured to allow the server to determine a search range for the mapping result according to the location information and determine the information of the virtual object corresponding to the image parameter using the mapping result within the search range.

20. The electronic device according to claim 18, wherein the image parameter comprises two-dimensional feature point information and three-dimensional feature point information of the current frame image; wherein the extracting the image parameter of the current frame image comprises:

performing two-dimensional feature point extraction for the current image frame and determining the two-dimensional feature point information of the current frame image;

acquiring depth information corresponding to the current frame image;

performing registration between the current frame image and the depth information corresponding to the current frame image to determine depth information of each pixel on the current frame image;

determining the depth information corresponding to the two-dimensional feature point information from the depth information of each pixel on the current frame image; and determining the three-dimensional feature point information of the current frame image using the two-dimensional feature point information and the depth information corresponding to the two-dimensional feature point information.

* * * * *